Oct. 18, 1949.   W. J. COTTON   2,485,477
METHOD OF PRODUCING NITROGEN OXIDE IN AN
ELECTRICAL DISCHARGE APPARATUS
Filed Sept. 9, 1944                    14 Sheets-Sheet 1
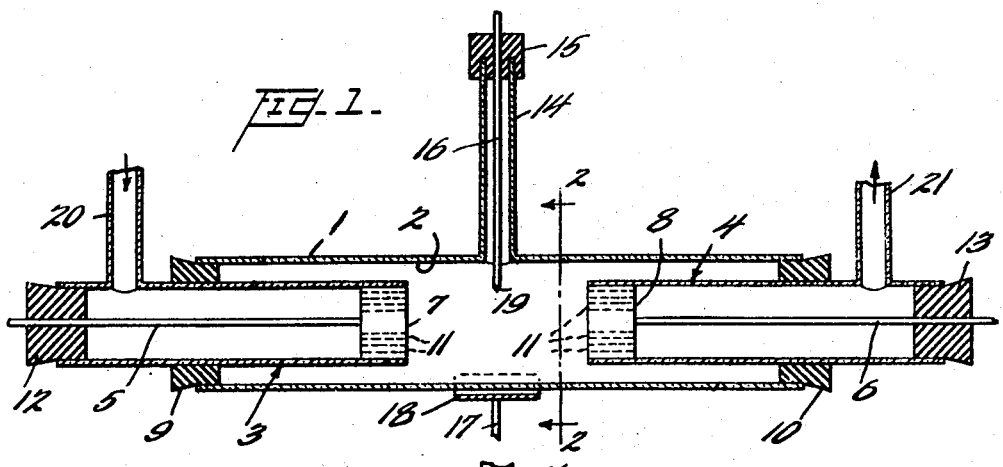
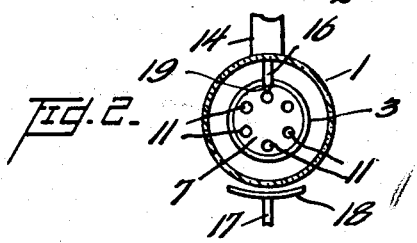
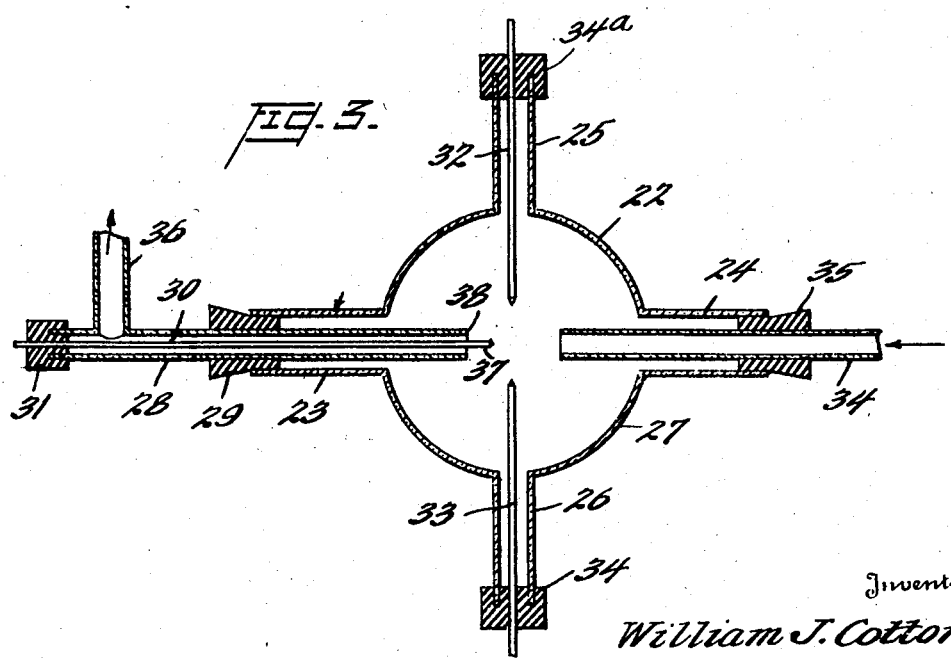
Inventor,
William J. Cotton,
By Ivan P. Tashof,
Attorney

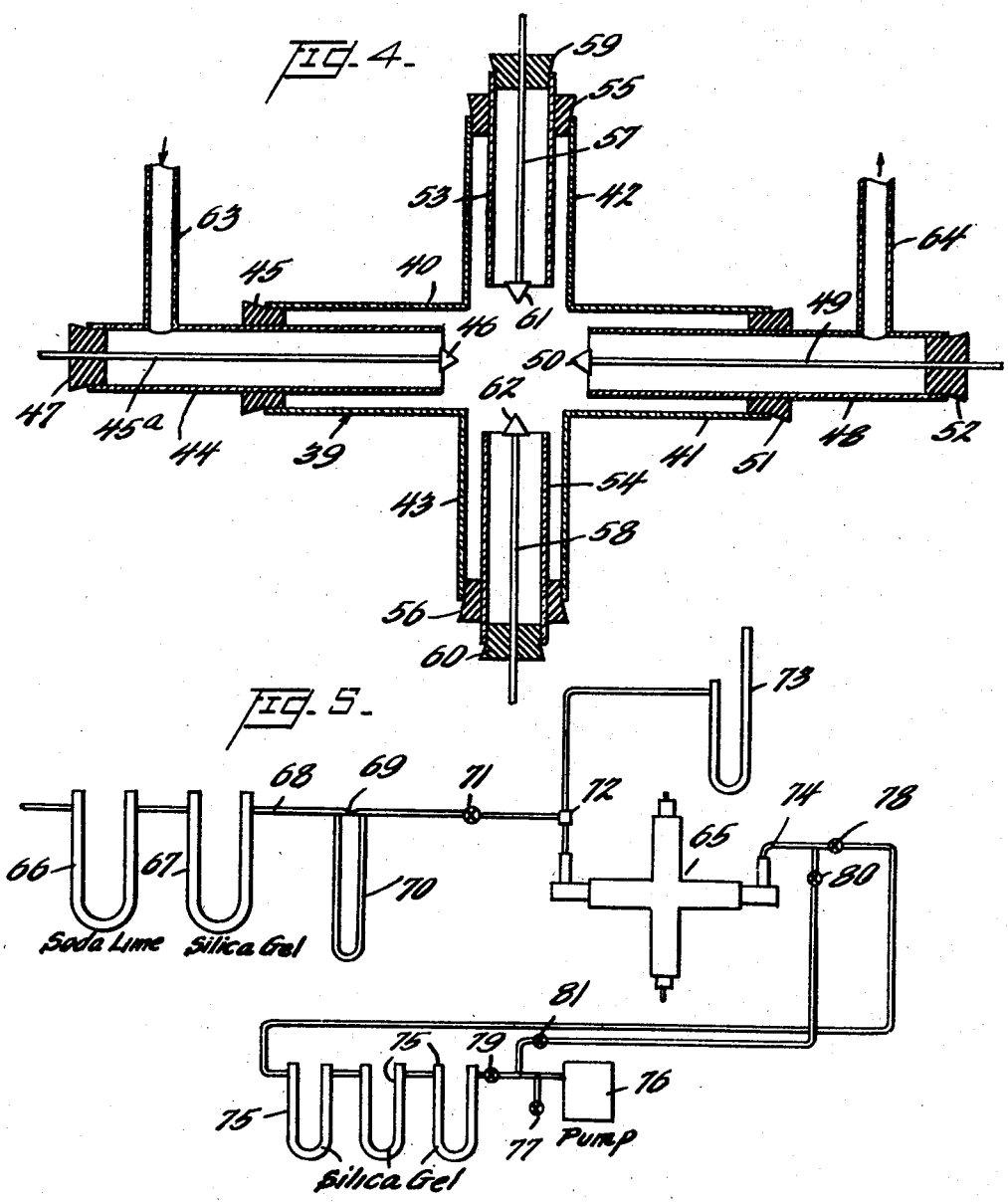

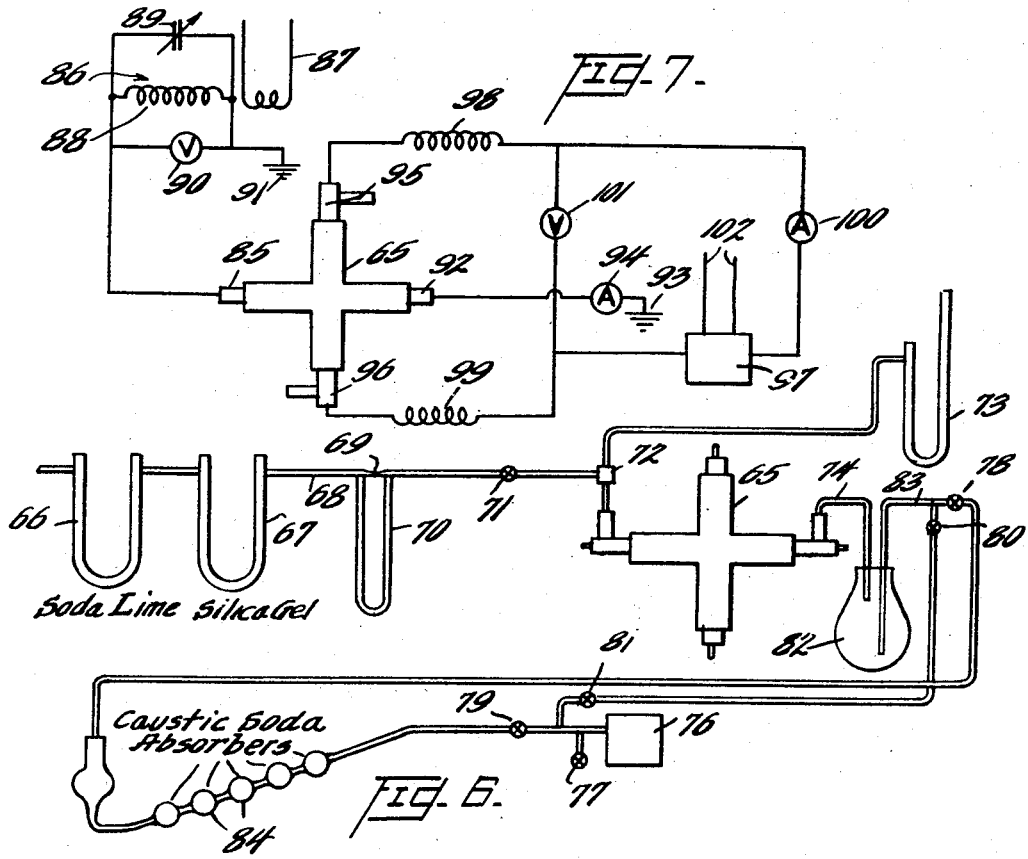

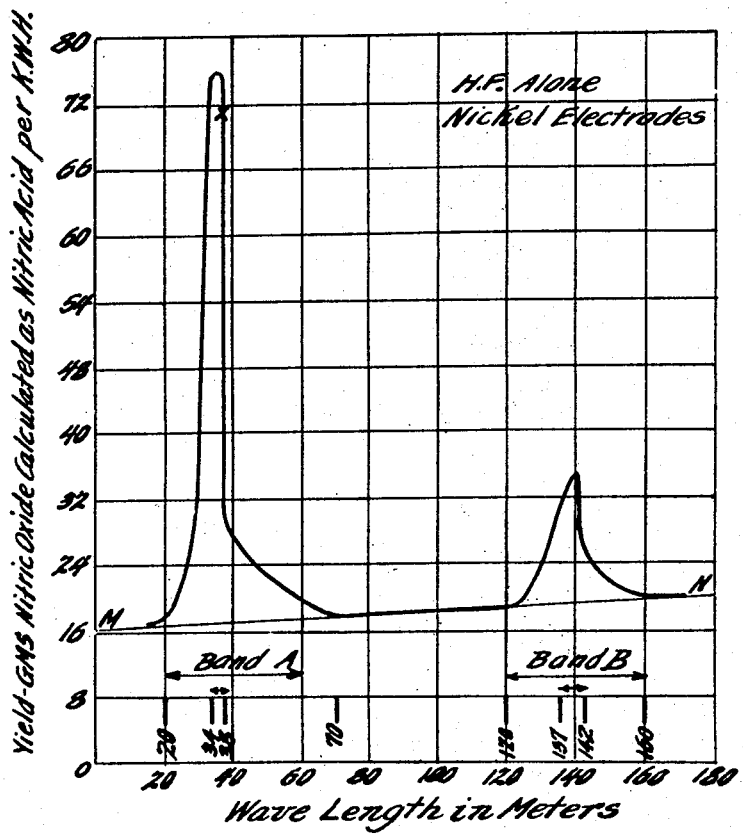

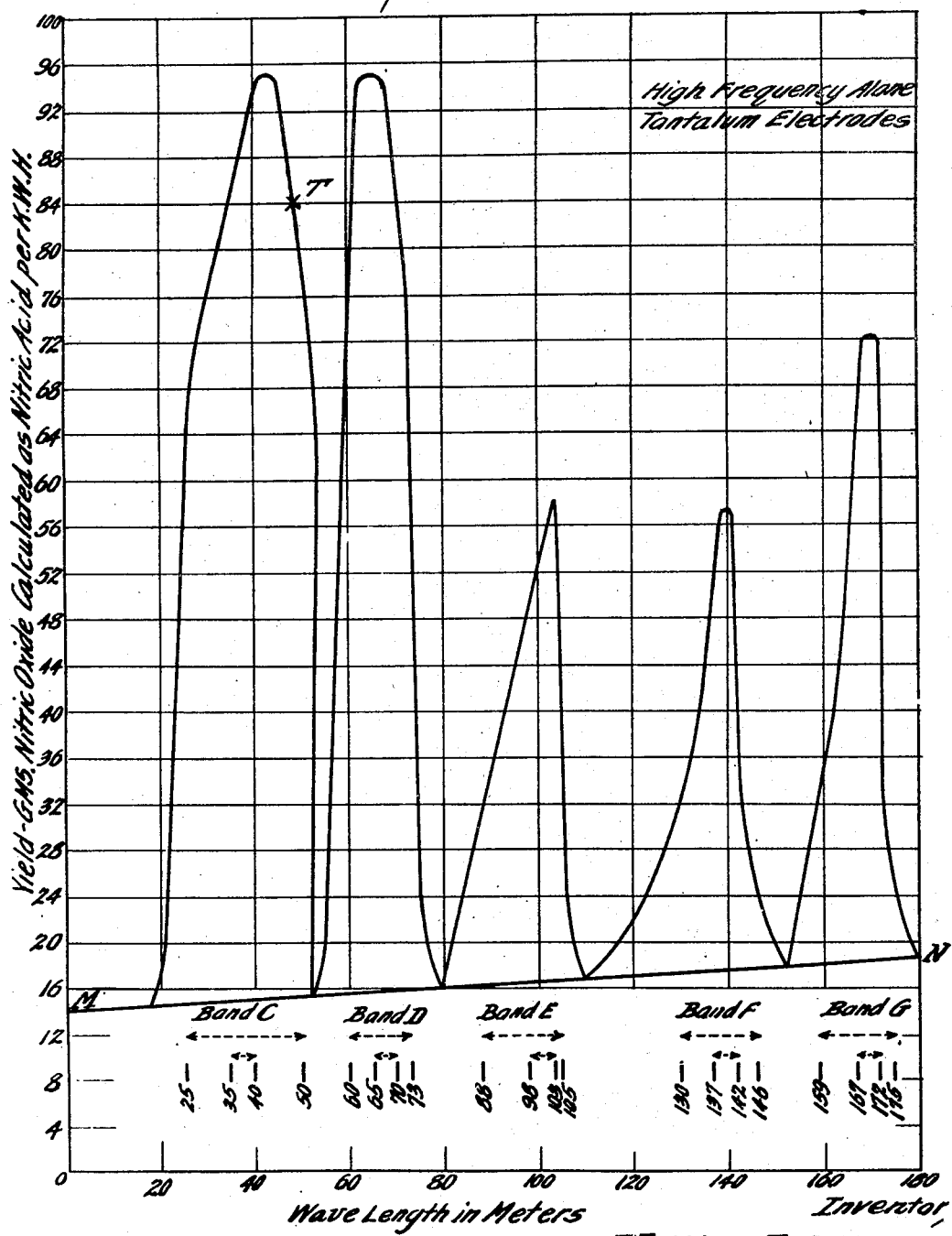

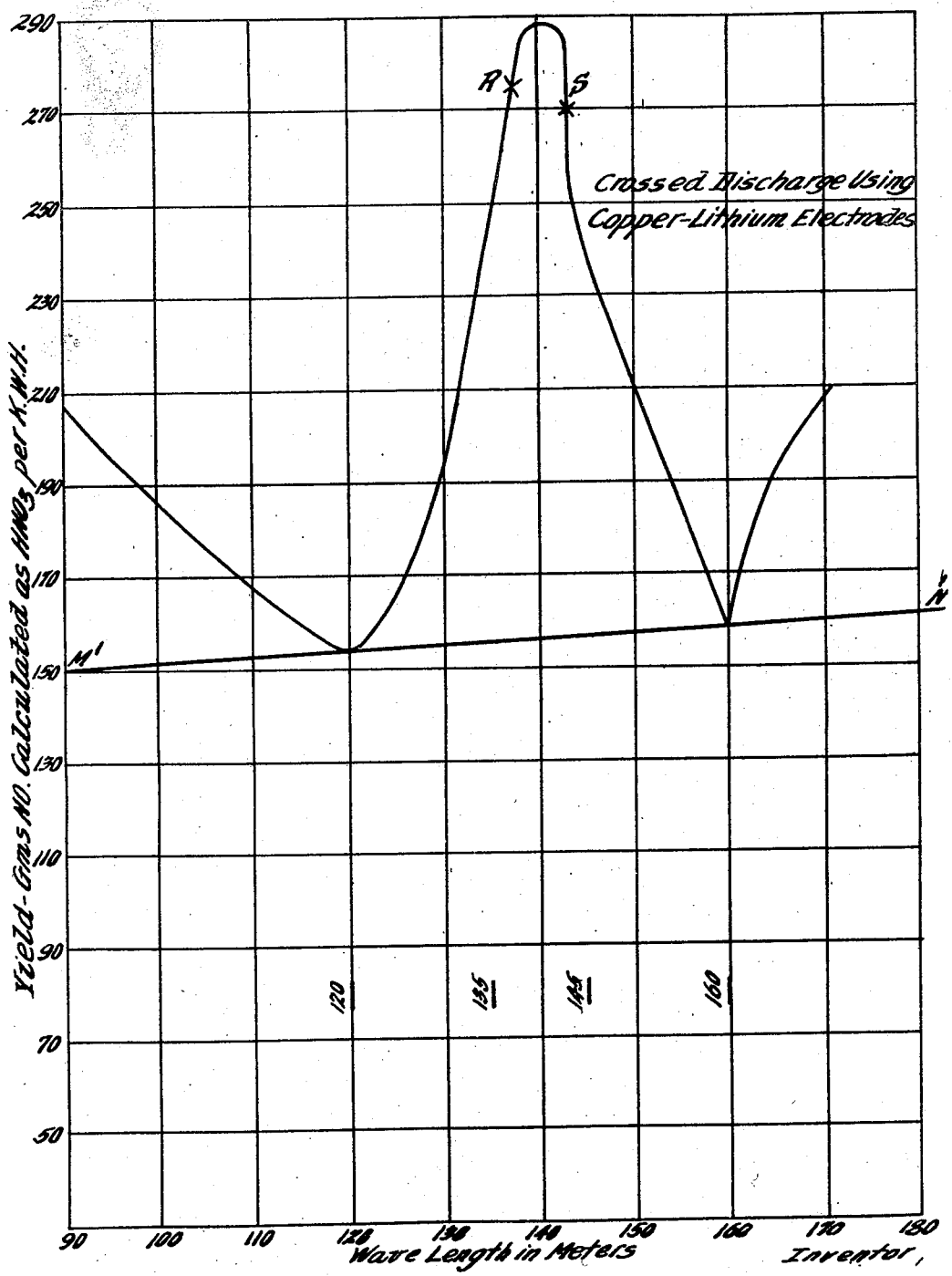

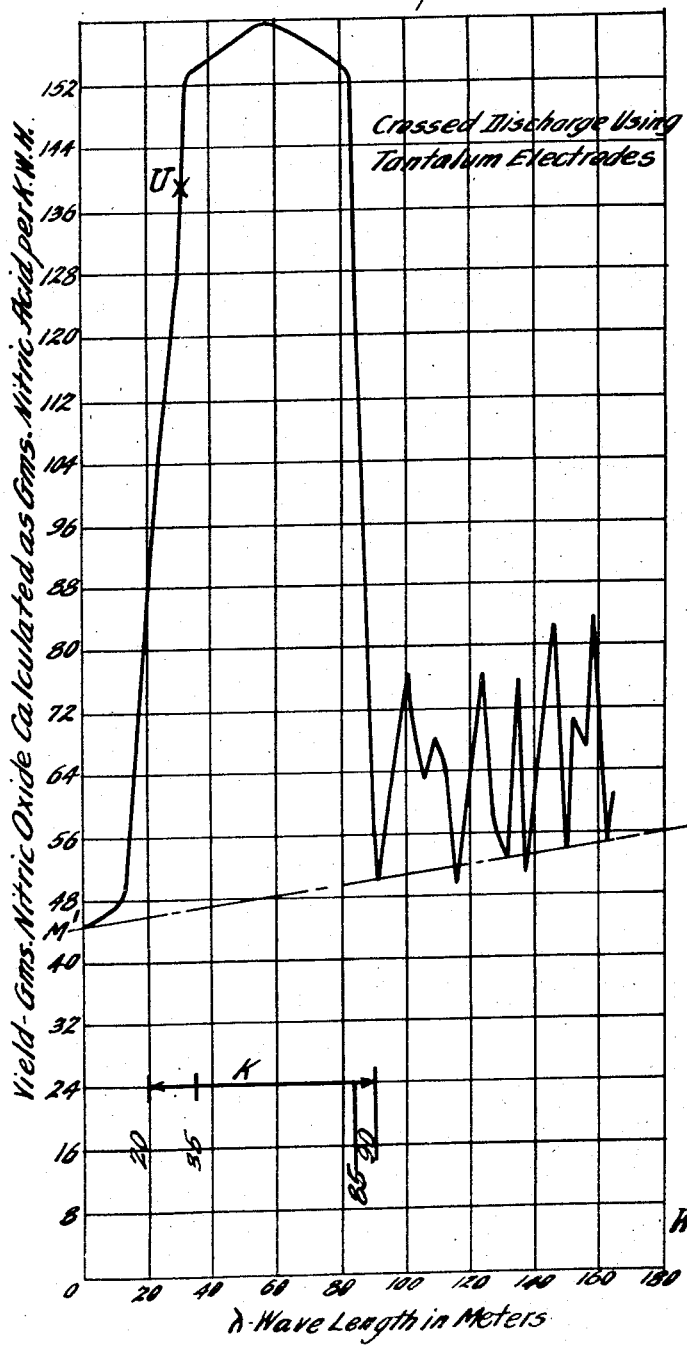

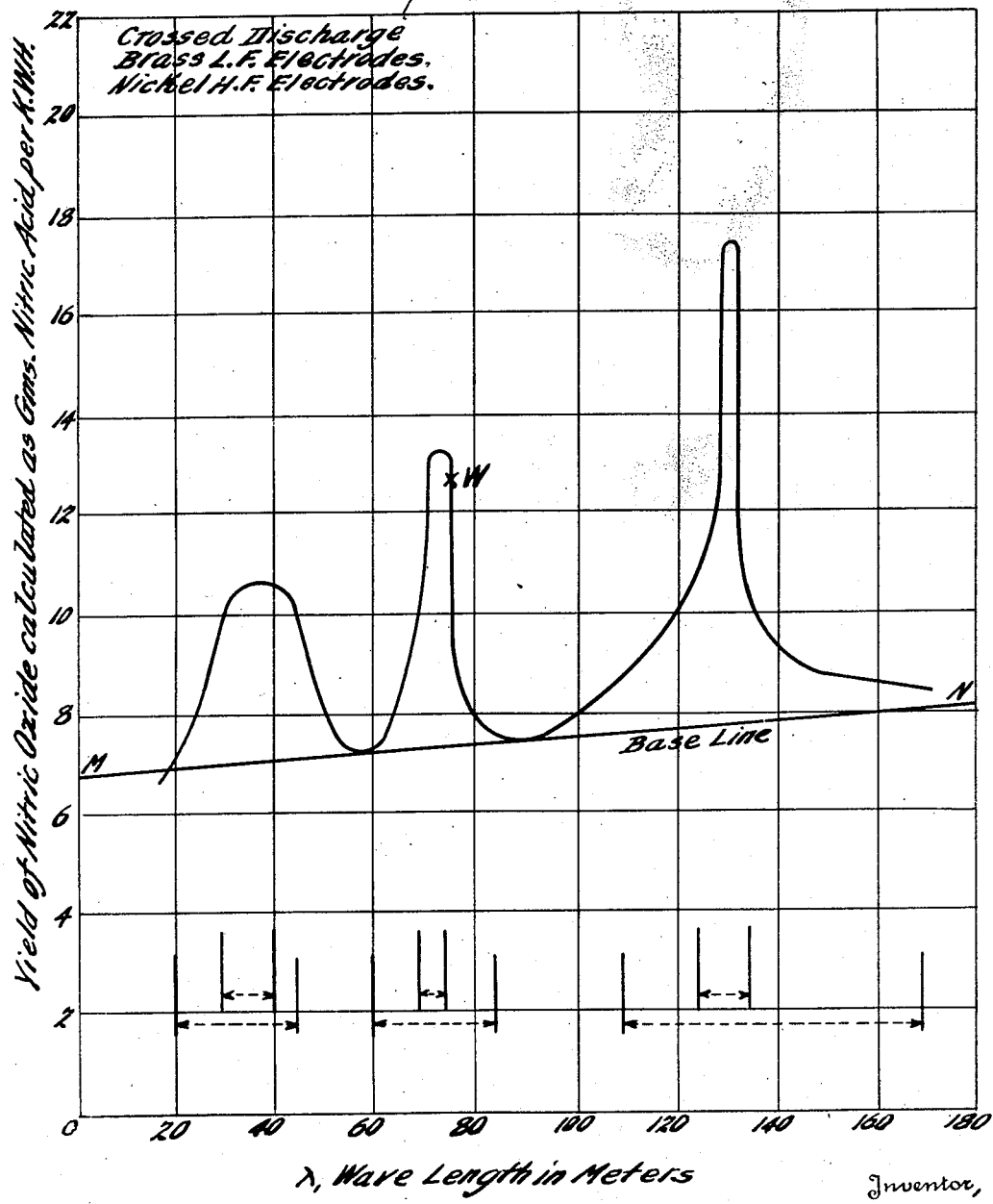

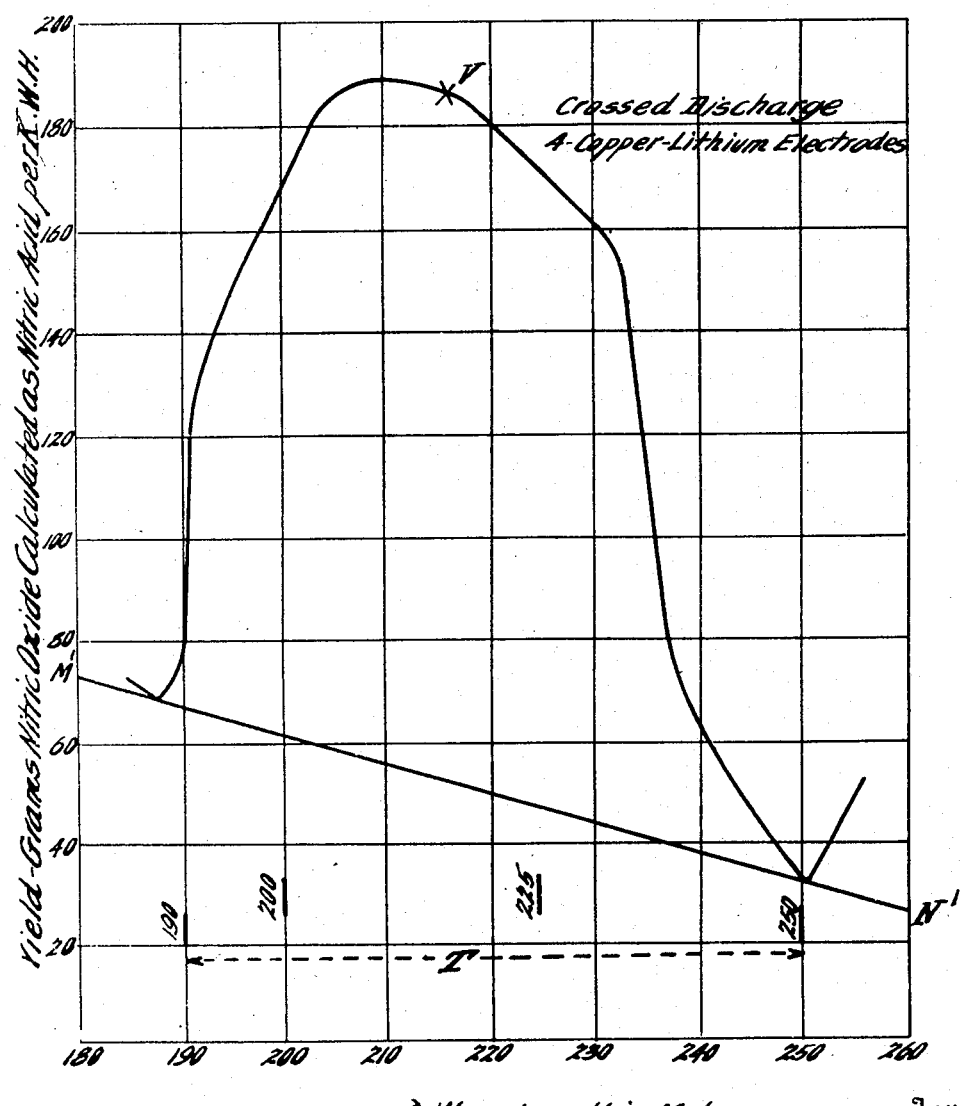

Inventor,
William J. Cotton,
By
Attorney

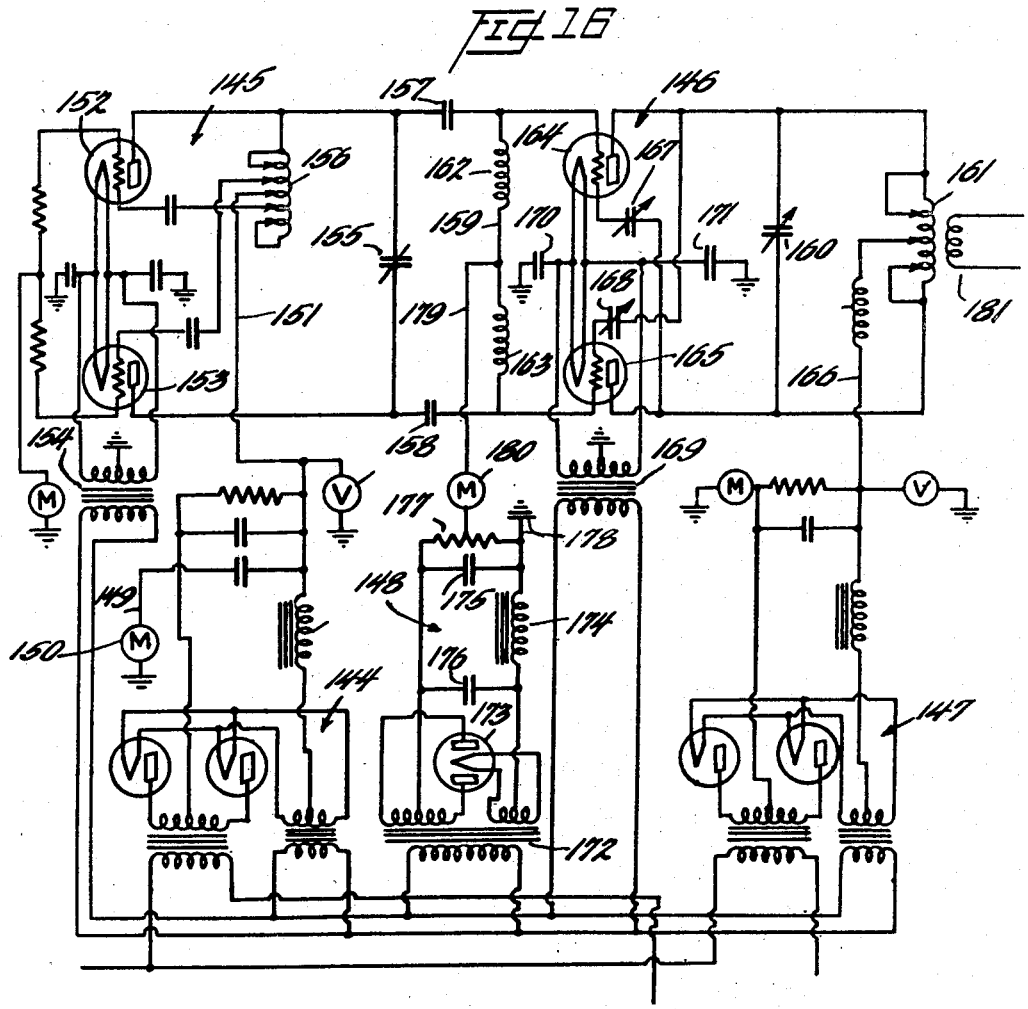

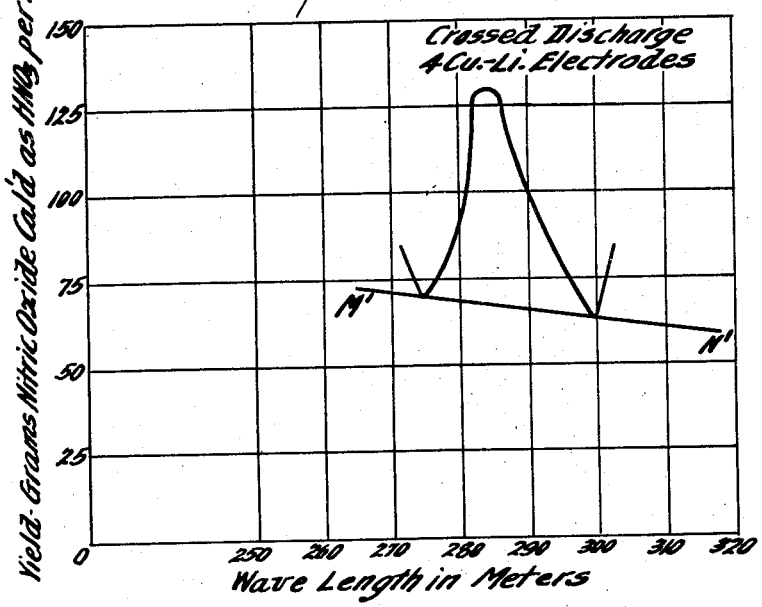
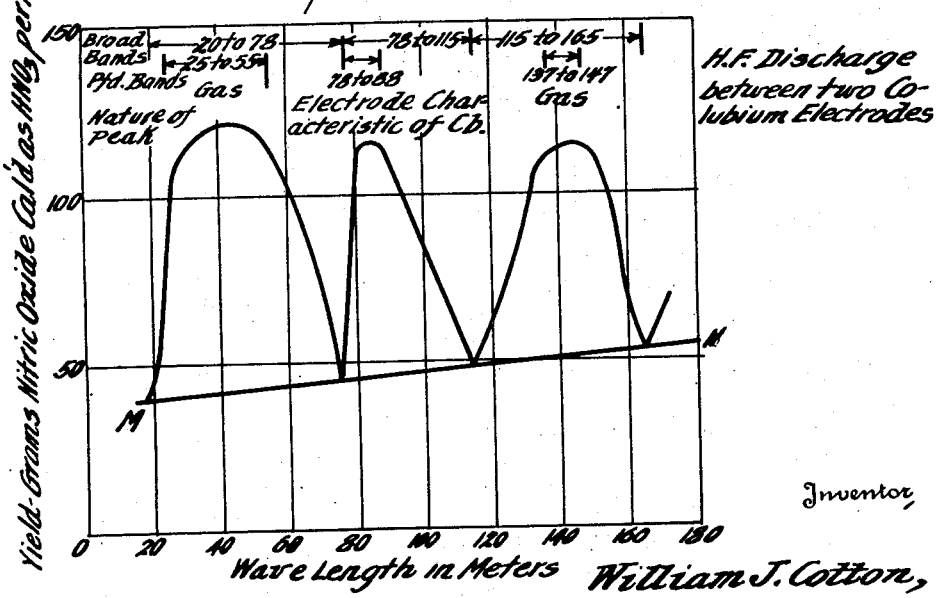

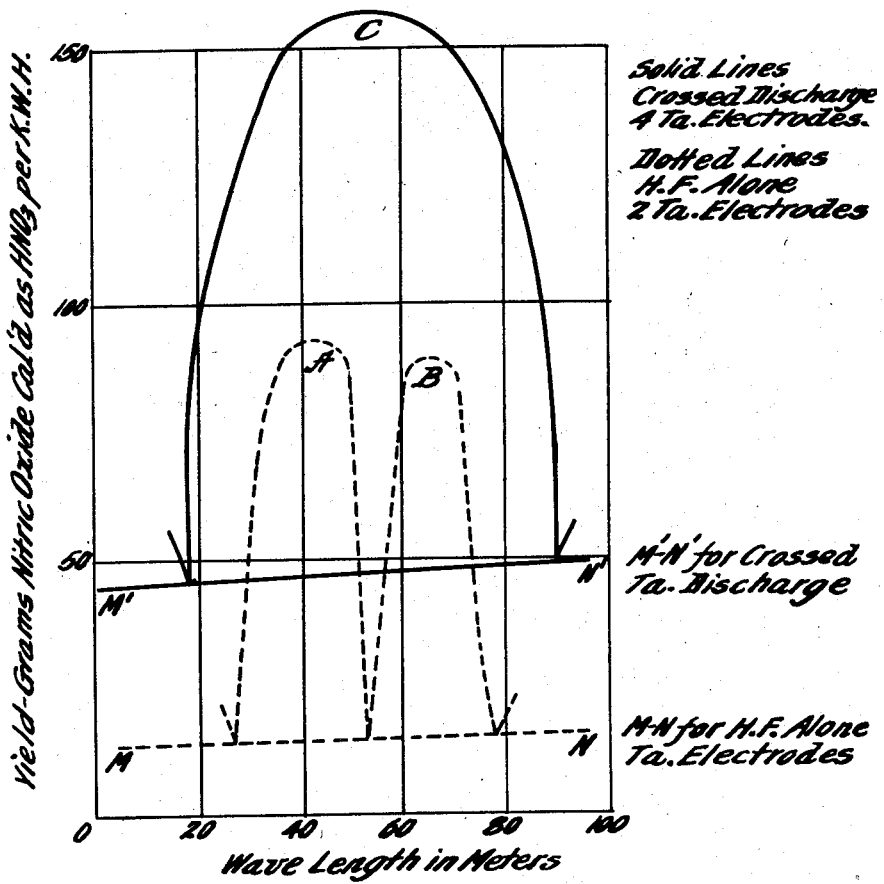

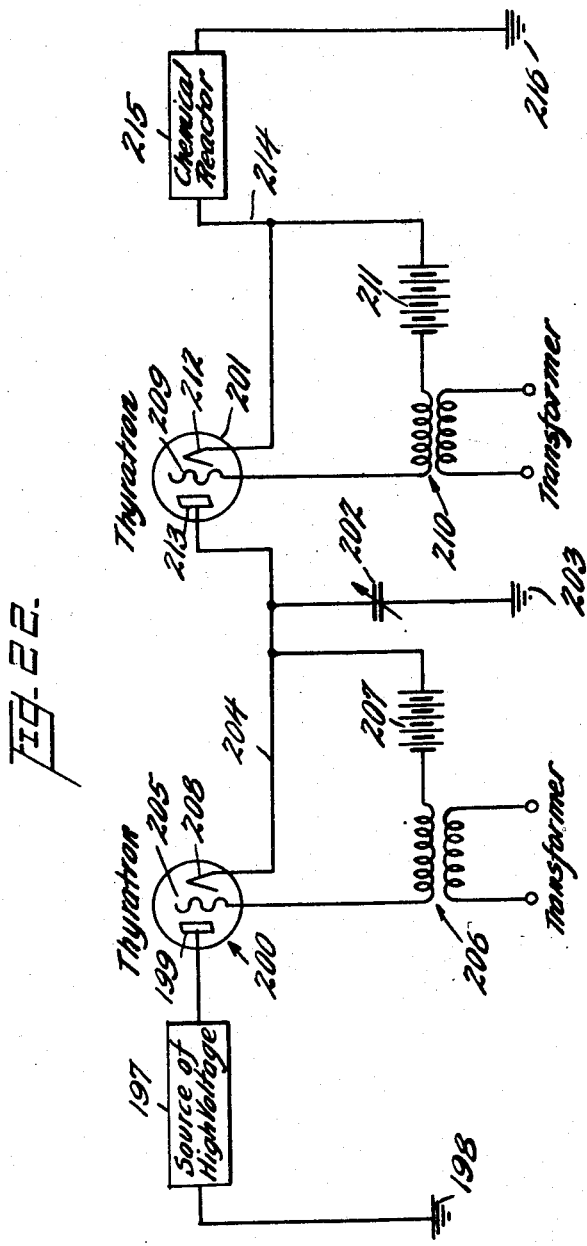

Patented Oct. 18, 1949

2,485,477

UNITED STATES PATENT OFFICE 2,485,477

METHOD OF PRODUCING NITROGEN OXIDE IN AN ELECTRICAL DISCHARGE APPARATUS

William J. Cotton, Chicora, Pa., assignor, by mesne assignments, to Koppers Company, Inc., a corporation of Delaware Application September 9, 1944, Serial No. 553,426

33 Claims. (Cl. 204—179)

This invention relates to the production of chemical entities by subjecting gaseous material to the action of an electrical discharge or a plurality of electrical discharges having a critical energy quantum or a critical frequency or a critical wave length. These critical electrical discharges may be used alone or crossed with another critical or non-critical discharge, as set forth in co-pending application No. 546,882.

These electrical energy quanta may be produced in any manner whatsoever, as for example, by the oscillatory type of generator used in radio broadcasting and which produces a sinusoidal wave, or by any one of a variety of electrical impulse generators, such, for example, as those developed for use in connection with radar or by any other means.

Broadly stated, one of the objects of the present invention is the electrochemical transformation of a gaseous medium, said transformation being catalyzed or speeded by critical energy quanta of an electromagnetic character.

Another object of the invention is to electrically activate chemical reactions by the use of critical quanta of electrical energy, the latter being generated by various types of generators, as, for example, an oscillatory generator or an impulse generator, as for example, various modifications of the Wimshurst machine.

Another object of the present invention is to effect chemical reactions and transformations by the application of one of a series of critical frequencies or their energy quanta equivalent of the reaction spectrum characteristic of the gas being reacted or of the reaction spectrum characteristic of the electrode material used in effecting an electrical discharge. The chemical reaction or transformation may be preferably effected by utilizing one of the critical frequencies or its quantum equivalent of the reaction spectrum characteristic of the gas being reacted and the selection of electrode material one of whose critical electrode quanta substantially corresponds or is substantially the same as one of the critical frequencies of the gas being reacted and thereby getting the combined effects from a single selected frequency common to both reaction spectra.

Stating the above somewhat differently, an object of the present invention is to produce a super peak yield of an electrochemically transformed gaseous product by subjecting the given gaseous medium to treatment in an electrical discharge apparatus in which the discharge is generated by one of a series of critical energy quanta or critical frequencies that is characteristic of both the gas being reacted and the electrode material of the discharge apparatus.

When, for a given electrode material, a discharge having certain frequency or energy quantum produces an increased yield for a given product and this same frequency or energy quantum is critical for the gas undergoing transformation, or approximately so, then the particular gas used and the particular electrode used both function to activate or promote the transformation, with the result that there is a super peak yield higher than the yield that is obtained by using the same gas and an electrical discharge having the critical frequency but with an electrode material which is not responsive to the critical frequency used in effecting an increase in yield.

In accordance with the present invention there is provided a method of producing a peak yield of an electrochemically transformed gaseous product by subjecting a given gaseous medium which may be a single gaseous medium or a plurality of gaseous media, to treatment with an electrical discharge generated by one of a series of critical energy quanta which are related to one another by the exponential expression $2^n c$, where $c$ is one of a series of critical energy quanta measured in ergs characteristic of the gaseous medium being reacted in producing a peak yield of the transformed product, and $n$ is any one of the integers from $-10$ to $+10$ including zero.

This peak yield may be produced when using the critical electrical discharge alone or by crossing the critical electrical discharge with another electrical discharge having a larger or smaller energy quantum.

When the energy quantum of the critical electrical discharge is expressed in terms of frequency, the transformation of the gaseous material may be effected by subjecting the gaseous medium to treatment with one of a series of critical frequencies which are related to one another by the exponential expression $2^n f$, where $f$ is one of a series of critical frequencies measured in megacycles characteristic of the gaseous material being reacted in producing a peak yield of the transformed product, and $n$ is any one of the integers from $-10$ to $+10$ including zero.

When the energy quantum of the critical electrical discharge is expressed in equivalent wave lengths the transformation of the gaseous material may be effected by subjecting the gaseous medium to treatment with one of a series of critical wave lengths which are related to one another by the exponential expression $2^n l$, where $l$ is one of a series of critical wave lengths measured in meters characteristic of the gaseous medium being reacted and producing a peak yield of the transformed product and $n$ has the same significance as above set forth.

In accordance with one form of the invention there is provided a method of producing a peak yield of a gaseous product in a gas discharge apparatus provided with separately spaced electrodes whose extended axes cross each other and have a plurality of electrode gaps therebetween, said method comprising subjecting the gaseous medium to the action of a plurality of electrical discharges which cross each other and which emanate from separately spaced electrodes present in said gas discharge apparatus. Each of said electrical discharges are generated by separately produced energy quanta of substantially different magnitudes, one of the energy quanta being of a series of critical energy quanta which are related one to the other by the exponential expression $2^n c$, where $c$ and $n$ have the significance above set forth.

In the crossed discharge method of effecting a peak yield of an electrochemically transformed product, when the critical energy quantum is expressed in terms of critical frequencies, then the critical frequency is selected from one of a series of critical frequencies which are related one to the other by the exponential expression $2^n f$; and when the critical energy quantum is expressed in terms of meters, the critical equivalent wave length is selected from one of a series of critical wave lengths which are related one to the other by the exponential expression $2^n l$. The exponential expressions $2^n f$ and $2^n l$ have the significance above referred to.

For the sake of clarity, the critical energies, although expressed in ergs, will be expressed as products of the megacycle frequency times a constant $k$, the latter being $6.554 \times 10^{-21}$, and is the conversion constant relating megacycles to the energy content thereof in ergs. By using the above terms, the simple relationship between critical energy magnitudes may be readily visualized.

For the production of nitrogen it is preferred that the critical electrical discharge be generated by a critical energy quantum appearing in the following group:

| Ergs of energy | Frequencies in megacycles | Equivalent wave lengths in meters |
|---|---|---|
| 2.04 to 2.19$k$ | 2.04 to 2.19 | 147 to 137 |
| 3.95 to 4.54$k$ | 3.95 to 4.54 | 76 to 66 |
| 7.32 to 9.68$k$ | 7.32 to 9.68 | 41 to 31 |

The preferred operating band for the production of nitric oxide in accordance with the invention herein set forth is in the range of 137 to 147 meters or 2.10$k$ to 2.04$k$ ergs of energy, since with said range the generating equipment now available is fairly efficient and the cost thereof is reasonable. As the art of generator design progresses the preferred band will probably shift to the 66 to 76 meter band, and later to the 31 to 41 meter band and even to shorter wave bands that are generically related by the exponential expressions herein set forth since the overall efficiency increases with the use of the shorter wave length or larger frequency. In this connection it is again desired to emphasize that these specific critical wave bands produce peak yields of nitric oxide and this is a very substantial reason for operating with these wave bands.

An electrical discharge having any of the critical energy quanta herein set forth may be crossed with a second discharge having a substantially different energy quantum with advantageous results, as hereinafter more particularly pointed out, the difference in energy quanta being preferably at least 0.2$k$ ergs of energy. The critical gas energy quantum may be expressed in ergs, megacycles or equivalent wave lengths.

The primary object of the present invention is to utilize the discoveries that have been made, as broadly set forth above, in the electrochemical transformation of gaseous materials and particularly in the electrochemical production of nitrogen oxide, to produce a peak yield.

It is an object of the present invention to produce a peak yield of a gaseous product in a gas discharge apparatus provided with separately spaced electrodes by introducing into the gas discharge apparatus a gaseous medium and subjecting the latter to the action of a plurality of electrical discharges which cross each other and which emanate from said separately spaced electrodes, each of said electrical discharges being generated by a separately produced energy quantum differing in magnitude by at least 0.2$k$ ergs of energy, one of the energy quanta being one of a series of critical energy quanta which are related one to the other by the exponential expression $2^n c$, where $c$ is one of a series of critical energy quanta measured in ergs characteristic of the gaseous medium being reacted in producing a peak yield of the transformed product and $n$ is any one of the integers from $-10$ to $+10$ including zero.

It is a further object of the present invention to carry out the method above set forth where the critical energy components supplied to the electrical discharge apparatus is present in an amount which is at least 6% of the total energy supplied, the amount of critical energy component in one form of the invention preferably varying from 35% to 65% of the total energy supplied.

In one form of the invention wherein the crossed discharges are used, as above set forth, there is produced a visible composite discharge having a volume larger than the volume of each of said discharges when the energy to generate either of said discharges is equal to the total energy supplied to the electrodes generating said visible discharge.

It is an object of the present invention to effect the electrochemical transformation under conditions which inhibit the decomposition or rearrangement of the desired electrochemically transformed end product.

When nitrogen oxide is being produced it is a dominant object of the present invention to carry out the transformation under conditions which inhibit the decomposition of the electrically transformed nitrogen oxide and this is accomplished by maintaining the temperature of reaction preferably between the temperature of the gaseous material prior to its introduction into the gas apparatus, said temperature being around ordinary room temperature, as, for example, 25° C. to 35° C., and below about 450° C. to 500° C., the temperature in one form of the invention being maintained between 25° C. to 35° C. and, as stated, below about 200° C.

However, it may be pointed out that the advantages and benefits of the present invention are adequate even though the reaction gas is maintained at higher temperatures, as, for example, 500° C. to 750° C., or even greater, as, for example, 800° C. to 2,000° C. As the temperature increases, in most cases, although not in all cases, the benefits of the present invention decrease, including a decrease in yield.

It is a further object of the present invention to provide a method in which the effluent gas has a nitric oxide concentration of a least 2% and which may be as high as 35% by volume, the nitric oxide content of the effluent gas produced in accordance with the present invention preferably has a concentration of between 4% to 35% by volume.

The limitations as to temperature and the concentration of nitric oxide in the effluent gas are applicable when using, by itself, any of the critical discharges herein set forth or when said critical discharges are crossed with other electrical discharges including those which are herein particularly set forth.

The reaction may be carried out so that there is substantially little difference between the temperature of the gaseous material introduced into the reactor, the temperature during the period the electrochemical transformation is taking place, and the temperature of the electrically transformed product, or the gaseous mass containing the same which passes from the reactor after the reaction has been substantially completed.

Another object of the present invention is to electrochemically effect the transformation of gaseous products utilizing a single discharge generated by a sinusoidal generator or an impulse generator, said discharge having a critical energy quantum as herein set forth or having a non-critical energy quantum, said discharge being generated by the minimum sustaining energy which will continuously maintain the discharge. When the minimum sustaining energy is used then the resulting discharge is a relatively cold discharge having a temperature less than 450° C. and frequently the temperature of the discharge is less than 200° C. This inhibits, as previously pointed out, the decomposition of the end product. In this connection it may be pointed out that the temperature of the gas may be relatively low and the discharge relatively cool, as, for example, having a temperature of less than 200° C. even though the electrodes themselves may glow brilliantly. Not only may a single discharge, as, for example 2.11 megacycles be used to effect the transformation of air but a discharge having this frequency may be utilized together with another discharge, said discharges crossing each other, preferable at right angles and emanating from separately spaced electrodes; and when the discharges do cross each other the minimum sustaining energy may be used to generate each discharge. However, preferably, the two discharges are adjusted to obtain a minimum of total energy supplied in which the two components are present in approximately equal amounts.

It may be stated that the minimum sustaining energy may be the product of a high voltage and a low current or it may be a product of a low voltage and a high current. In other words, the product of the voltage times the current will remain constant over quite a range of combinations when minimum sustaining energy is used. It is preferred to use minimum sustaining energy where the voltage is adjusted to that minimum voltage which will sustain the discharge.

However, the invention as herein set forth, both in its broad and specific aspects, may be carried out utilizing discharges which are generated by energy exceeding the minimum sustaining energy which will continuously maintain each of the crossed discharges when a crossed discharge is used, but under these circumstances there is a tendency for the yield of the electrochemically transformed product to be reduced.

The luminous crossed discharges generated from separately spaced electrodes, one set of which is supplied with electrical energy which differs in energy quantum or frequency from that electrical energy supplied to the other set, said energies being generated by an oscillatory or by an impulse machine, should be continuously maintained, preferably at the minimum sustaining energy in order to provide a maximum yield of the electrochemically transformed product; that is, any substantial fluttering of the discharges should be avoided as such fluttering tends to decrease the yield of the electrochemically transformed product. By "fluttering" is meant the periodic partial extinction of one or both of the discharges, this being akin to the periodic extinction which is characteristic of the so-called "singing arc." Each or both of the electrical discharges may be selected from a discharge having one of the critical energy quanta or frequencies herein set forth.

It is another object of the present invention to effect the electrochemical transformation of the gaseous material under the broad or specific conditions above set forth utilizing a single discharge or plurality of discharges which are crossed while maintaining the pressure in the gas discharge apparatus below about half an atmosphere. This represents the preferred pressure which, in a sense, is critical, as above this pressure, under the broad and preferred conditions herein set forth, the yield of the electrochemically transformed product, as, for example, nitric oxide, begins to diminish.

It has been discovered that when a nitrogen-and-oxygen-containing material, such as air, is subjected to the action of a plurality of crossed discharges, one of said discharges being generated by cyclic energy of a frequency within the wave band varying between about 120 meters and about 160 meters, peak yields of nitric oxide are produced, as shown by Fig. 11 of the drawing. This peak wave band, while varying broadly between about 120 meters and about 160 meters, more specifically varies between about 135 or 137 meters and 145 or 147 meters for optimum yield. Stated differently, one of said discharges is generated by a cyclic energy quantum equivalent to a sinusoidal frequency between about 2.50 mc., corresponding to 120 meters, and about 1.875 mc., corresponding to 160 meters. The other discharge may be generated by a cyclic energy quantum equivalent to a sinusoidal frequency between about 10 cycles per second (30,000,000 meters) and about 10,000 cycles per second (30,000 meters). The electrochemical transformation may be carried out under a pressure between about 150 mm. of mercury and about 725 mm. of mercury or, under a more limited pressure, varying between 320 mm. of mercury and about 360 mm. of mercury.

The invention also comprises effecting electrochemical transformation of a gaseous medium consisting principally of oxygen gas and nitrogen gas by subjecting the latter to the action of a composite electrical discharge, preferably luminous, produced by the intersection of at least two separate cyclic electrical discharges of different energy quantum, one of said discharges being generated by cyclic electrical energy having an energy quantum equivalent to a sinusoidal frequency between about 2.19 mc. (137 meters) and about 2.04 mc. (147 meters), said frequency band being a critical frequency band for activating the nitrogen-and-oxygen-containing medium which is being reacted, and the other discharge being generated by a cyclic energy quantum equivalent to a sinusoidal frequency between about 1 mc. (300 meters) and about 12 mc. (25 meters).

The invention in one of its forms has as an object thereof the electrochemical transformation of gaseous material utilizing one or more of the critical discharges herein set forth by subjecting the gaseous material to a plurality of electrical discharges which cross each other and which emanate from separately spaced electrodes, each of said electrical discharges being generated by separate electrical components produced by an oscillatory machine or by an impulse machine, said electrical components differing in energy quantum by at least .2 erg of energy, or 200,000 cycles per second, and one of said discharges being a silent discharge. However, the invention in its preferred form is not limited to the use of a plurality of electrical discharges which cross each other and which emanate from separately spaced electrodes, and one or both of said discharges being luminous discharges. Both discharges of the character above set forth may be silent or dark discharges, one or both of said silent discharges being one of the critical discharges herein set forth, and being generated by one of a series of critical energy quanta which are related to each other by the exponential expression $2^n c$, where $n$ and $c$ have the significance hereinbefore referred to.

It is a further object of the present invention to produce nitrogen oxide utilizing the broad and preferred conditions set forth above. The nitrogen-and-oxygen-containing gaseous medium which produces nitrogen oxide, as, for example, nitric oxide, NO, upon treatment with crossed discharges, is introduced into the gas discharge apparatus and subjected to the action of a plurality of discharges which cross each other and which emanate from separately spaced electrodes present in said gas discharge apparatus, at least one of said electrical discharges being generated by one of a series of critical energy quanta which are related to one another by the herein set forth exponential expression $2^n c$, each of said electrical discharges being generated by separate energy components of substantially different energy quanta, said difference being, preferably, at least $0.2k$ of an erg or 200,000 cycles.

The larger energy quantum component preferably comprises at least 8% of the total energy, although this may vary as hereinbefore set forth.

Referring to the use of cyclic energy in carrying out the present invention, that is, substantially sinusoidal electrical energy, by "high frequency electrical energy" is meant sinusoidal energy between the frequency limits of about 0.2 megacycle (hereinafter frequently referred to as mc.) and about 30,000 mc. This corresponds to wave length limits of about 1500 meters to about one centimeter.

By a "lower frequency sinusoidal electrical energy" as used herein, is meant electrical energy between the frequency limits of about 10 cycles and about 200,000 cycles. This corresponds to wave lengths of about 30,000,000 meters to about 1500 meters. Ordinarily, 10, 25 and 60 cycles alternating current electrical energy is typical of low frequency energy under conditions as they prevail today. Generally the low frequency energy is less than about 10,000 cycles per second and preferably less than about 1,000 cycles per second, the most generally used low frequency being about 10, 60, 100 and 250 cycles per second. The high frequency sinusoidal energy is about 200,000 cycles per second and is usually much greater, preferably above 500,000 cycles per second, although excellent results have been obtained when one of the electrical discharges is approximately about 500,000 cycles per second.

This invention is more specifically directed to the production of nitrogen oxides such as nitric oxide, although some aspects of the invention are broadly stated and broadly claimed, since the principles thereof are applicable in general to the electrochemical transformation of numerous materials in their gaseous state. It may be pointed out that various gaseous media may be treated with an electrical discharge generated by one of a series of critical energy quanta which are related one to another by the exponential expression $2^n c$, where $c$ is one of a series of critical energy quanta measured in ergs characteristic of the gaseous medium being reacted in producing a peak yield of the transformed product, and $n$ is any one of the integers from $-10$ to $+10$ including zero.

The energy quanta for each electrical discharge which will produce a peak yield of the electrochemically transformed product will, of course, be different for each gaseous medium reacted, the transformation being effected utilizing an electrical discharge generated by one of a series of critical energy quanta which are related to each other by the exponential expression $2^n c$.

It is well known that a specific sinusoidal wave length or frequency has a definite, well known energy content, known as the photon, and that given the particular wave length or frequency employed, the energy quantum or the energy content thereof may be easily calculated.

It may be pointed out that when converting from lambda, $\lambda$, wave lengths in meters to ergs of energy, the following formula may be used:

$$\text{Ergs of energy} = \frac{k}{\lambda} \text{ wave lengths in meters}$$

The constant "$k$" is merely the quantum energy of 300 mc. (1 meter) sinusoidal wave and is obtained in the usual manner by multiplying Planck's constant $(6.554 \times 10^{-27})$ by 300 mc. $(3 \times 10^8)$, the resulting figures being $1.967 \times 10^{-18}$.

It may be pointed out when using crossed discharges that it is recognized that the magnitude of the so-called smaller quantum energy may approach the magnitude of the larger quantum energy, or vice versa, and, in some instances, the smaller quantum energy and the larger quantum energy may become equal. Usually, however, in order to produce good yield there should be at least a difference of $0.2k$ of a megacycle between the smaller quantum energy and the larger quantum energy.

The present invention will be disclosed in connection with the accompanying drawing, in which Fig. 1 is a cross sectional view of a reactor apparatus capable of generating crossed discharges of the character herein described and in which one of the four electrodes is external to the reactor;

Fig. 2 is a transverse cross sectional view taken on the lines 2—2 looking in the direction of the arrows in Fig. 1;

Fig. 3 is a cross sectional view of a modified reactor apparatus in which one electrode serves as a common ground but in which all three electrodes are internal.

Fig. 4 is a reactor similar to that shown in Fig. 1 except that all four electrodes are internal and the electrode tips are pointed;

Fig. 5 is a diagrammatical representation of an apparatus for drying the air prior to its introduction into the reactor and for absorbing the nitric oxide content of the exit reaction gases;

Fig. 6 is similar to Fig. 5 in that the same provision is made for drying the air prior to its introduction into the reactor but differs in the manner in which the product is recovered. This is done by providing a flask in which nitric oxide is converted to nitrogen dioxide and the latter absorbed in a solution of caustic potash or caustic soda;

Figure 15:
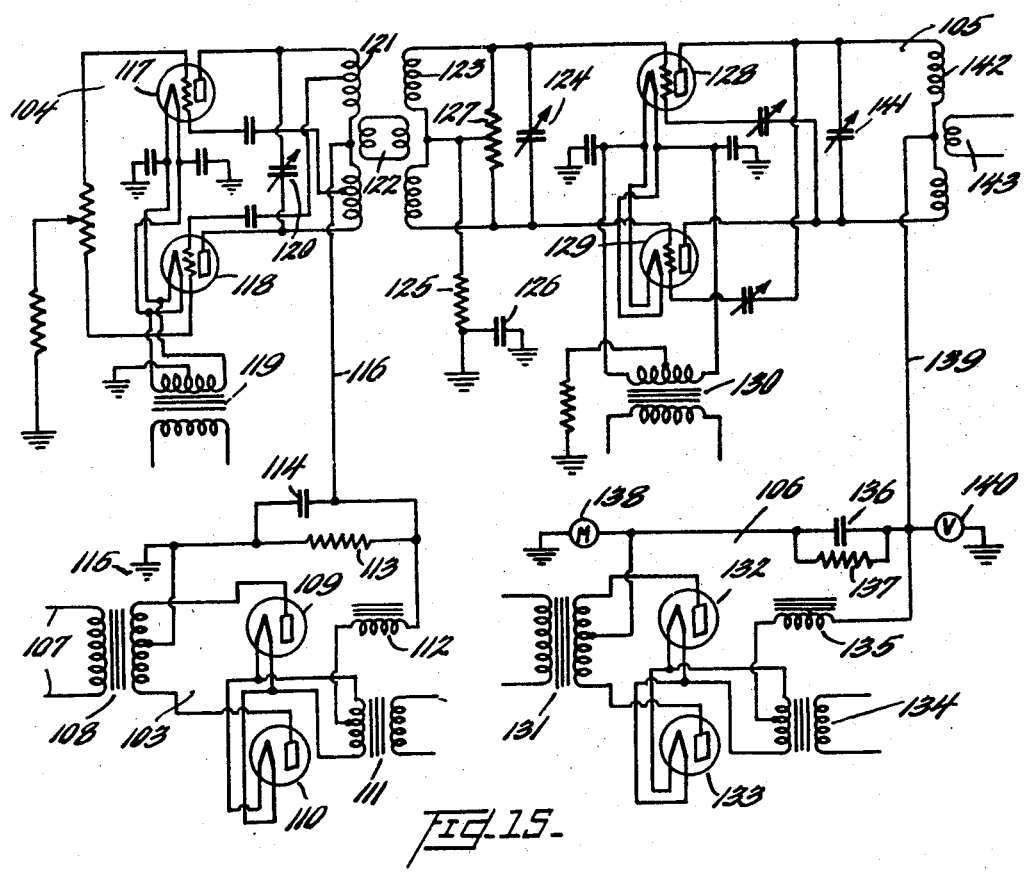
Figure 17:
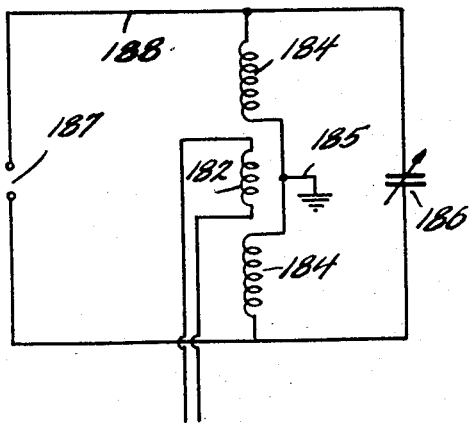
Figure 18:
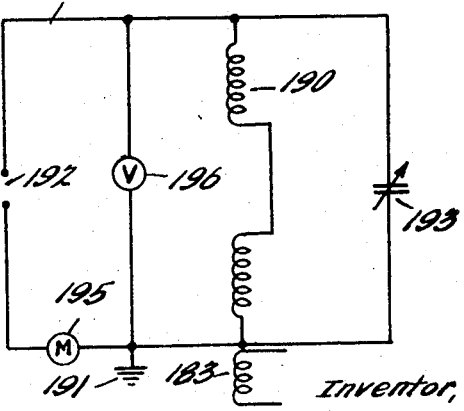

Fig. 7, diagrammatically sets forth the connection of the high frequency electrodes to the generator and tank circuits and the low frequency electrodes to the source of low frequency energy;

Fig. 8 is a set of curves depicting the results obtained when using the reactor set forth in Fig. 1. The abscissa indicates wave lengths, lambda λ, in meters and the ordinate indicates the yield of nitric oxide calculated as grams of nitric acid per kilowatt hour. The curve A—B represents the yields obtained when employing the reactor set forth in Fig. 1 using a high frequency discharge alone when the high frequency vertical electrodes are of brass. The curve C—D—E represents the yield obtained when employing the reactor set forth in Fig. 1 and crossed discharges, one discharge being generated by 60-cycle low frequency energy between horizontal button electrodes of an alloy 98% copper and 2% lithium, and the other discharge being generated between vertical brass electrodes by high frequency energy having a wave length corresponding with the abscissa;

Fig. 9 is a graph depicting the results obtained when using the reactor set forth in Fig. 3 using high frequency energy alone in which the vertical electrodes are of nickel and the wave length of the high frequency energy corresponds to the abscissa, and the ordinate indicates the yield of nitric oxide calculated as grams of nitric acid per kilowatt hour;

Fig. 10 is a graph depicting the results obtained when using the reactor set forth in Fig. 4 when using high frequency energy alone across a horizontal pair of tantalum electrodes, after removing the vertical pair of electrodes, and in which the high frequency energy supplied has a wave length corresponding to the abscissa, and the ordinate indicates the yield of nitric oxide calculated as grams of nitric acid per kilowatt hour;

Fig. 11 is a graph depicting the results obtained when using the reactor set forth in Fig. 4, all four pointed electrodes being of an alloy of 98% copper and 2% lithium. The low frequency energy supplied is 60-cycle while the high frequency supplied to the cross discharge has a wave length, lambda, λ, in meters, corresponding to the abscissa, and the ordinate indicates the yield in grams of nitric oxide calculated as grams of nitric acid per kilowatt hour;

Fig. 12 is a graph depicting the results obtained when using the reactor set forth in Fig. 4, all four electrodes being of tantalum. The low frequency energy supplied is 60-cycle and the high frequency energy supplied has a wave length corresponding with the abscissa, and the ordinate indicates the yield in grams of nitric oxide calculated as grams of nitric acid per kilowatt hour;

Fig. 13 is a graph depicting the results obtained when using the reactor set forth in Fig. 4 in which the vertical pair of electrodes consist of nickel points and are supplied with high frequency energy of a wave length corresponding with the abscissa and in which the horizontal pair of electrodes consist of brass rods with sharply pointed tips and supplied with low frequency energy of 60 cycles. The ordinate indicates the yield in grams of nitric oxide calculated as grams of nitric acid per kilowatt hour;

Fig. 14 is a graph depicting the results obtained when using the reactor set forth in Fig. 4, in which all four electrodes tips are pointed and consist of an alloy of 98% copper and 2% lithium. The high frequency energy supplied has a wave length, lambda, in meters, corresponding with the abscissa, and the low frequency energy supplied is 60-cycle. The ordinate indicates the yield of nitric oxide calculated as grams of nitric acid per kilowatt hour;

Fig. 15 sets forth the hook-up of one of the high frequency generator units used for producing the high frequency energy supplied to the tank circuit which connects the generator to the reactor;

Fig. 16 sets forth the hook-up of another high frequency generator unit used for producing the high frequency energy supplied to the tank circuit which connects the generator and the reactor;

Fig. 17 sets forth one form of tank circuit, known as center grounded, that was used in obtaining some of the results set forth;

Fig. 18 sets forth another type of tank circuit, known as end grounded, that was also used in obtaining many of the results set forth;

Fig. 19 is a graph depicting the results obtained when using the reactor set forth in Fig. 4 in which all four electrode tips are pointed and consist of an alloy of approximately 98% copper and 2% lithium. The high frequency energy supplied has a wave length, lambda, in meters, corresponding with the abscissa, and the low frequency energy supplied is 60 cycle. The ordinate indicates the yield of nitric oxide calculated as grams of nitric acid per kilowatt hour;

Fig. 20 is a graph depicting the results obtained when using the reactor set forth in Fig. 4 in which the two vertical electrodes are removed and the two horizontal electrode tips are pointed and consist of columbium metal. The high frequency energy supplied has a wave length, lambda, in meters, corresponding with the abscissa, and the low frequency energy supplied to the reactor is 60-cycle energy. The ordinate indicates the yield of nitric oxide calculated as grams of nitric acid per kilowatt hour;

Fig. 21 sets forth two graphs with the object of comparing the two when plotted to the same set of ordinates, the one being superimposed over the other. The two graphs thus combined for purposes of comparison are the lefthand portions of Figures 10 and 12, in which the broken or dashed curves correspond with Fig. 10 and the solid lines with Fig. 12;

Fig. 22 is a diagrammatic representation of the more essential elements of an impulse generator of one type.

The reactor apparatus as shown in Figure 1 comprises a hollow reactor vessel 1 having an interior wall 2, said reactor vessel being made of non-conducting or insulating material, such as a ceramic material, including glass, and preferably a high melting glass, as exemplified by a borosilicate glass. Within the reactor vessel 1 are positioned sheath tubes 3 and 4, provided with electrode leads 5 and 6, said leads having button-like electrode terminals 7 and 8, which are made of a good conducting material, exemplified by almost any metal.

The preferred material of the electrodes will depend to a substantial extent upon the sustaining voltage required to maintain the discharge, for the reason that the minimum sustaining voltage required for pure metals has been found to be a periodic function of the atomic number of said metal in the same manner as is most of the properties of the elements. Further, in the case of a binary alloy of two metals the minimum sustaining voltage has been found to drop to a minimum, after which it again rises as the composition of the alloy changes from 100% of one component to 100% of the other component. The electrode buttons or equivalent electrodes may consist of copper, copper alloys, columbium, columbium alloys, silver, silver alloys, iron, iron alloys, nickel, nickel alloys, chromium, chromium alloys, tantalum, tantalum alloys, tungsten, or tungsten alloys. Among the specific alloys that may be used for electrode materials may be brass, bronze, copper (98%)-lithium (2%), copper (98%)-beryllium (2%), lead (98%)-lithium (2%), lead (96%)-lithium (4%), zinc (98%)-lithium (2%), and zinc (93.4%)-lithium (6.6%). The tantalum and tantalum alloy electrodes are capable of withstanding exceedingly high minimum sustaining voltages without substantial oxidation.

The button electrode terminals 7 and 8 are mounted in sheaths 3 and 4 which are positioned centrally in the reactor vessel 1. These sheaths are mounted in and pass through air tight insulating closures 9 and 10 which may be of rubber, cork, or similar material. The button electrodes 7 and 8 are provided with a plurality of passage ways 11 which function to split the reacting gaseous medium into a plurality of pencil-like streams, so as to better insure the contact of the gaseous medium being reacted with the crossed discharge. The outer end of the sheath tubes 3 and 4 are respectively closed with tight insulating closures 12 and 13. The reactor vessel has sealed into its wall a tubular member 14 closed at its outer end with a closure member 15 which is perforated and through which there passes the high frequency electrode 16, which is made of any of the materials herein set forth. The reactor apparatus is preferably provided with an external electrode 17 having a terminal 18, said electrode being made of any electrically conducting material. Preferably the electrode terminal consists of a suitable metal, such as copper, shaped to the contour of the reactor vessel 1 so as to close an arc varying preferably from 40° to 80° with the tip 19 of the internal electrode, said tip serving as center of curvature. The external electrode terminal 18 is shaped and positioned to draw the discharge emanating from the electrode terminal tip 19 centrally downward between the button electrodes 7 and 8, thereby insuring maximum efficiency and yield. The external electrode terminal 18 may be placed in direct contact with the outer wall of the reactor vessel 1 but is preferably spaced at such a distance from the external wall of the reactor vessel as to minimize any heating of the wall. In practice, it has been found, if the external terminal 18 is from 1 to 2 mm. from the external wall of the reactor vessel, satisfactory results are obtained.

It is desired to point out that the reactor set forth in Fig. 1 need not necessarily be mounted in the position shown but that it may be turned to any convenient angle and even inverted. The gaseous material to be reacted in accordance with the present invention, after being dried in the apparatus set forth in either Figures 5 or 6 and in the manner hereinafter described, enters through the inlet member 20, passes through the sheath, 3, the button electrode 7, and through the discharge. The reaction product passes through the electrode terminal 8 and sheath 4, and leaves the reactor vessel by means of the exit conduit 21. The reaction product passes through a medium for extracting its nitric oxide content, the precise method of extraction being hereinafter set forth in connection with the descriptions of Figures 5 and 6.

It is desired to point out that for the button electrodes 7 and 8 there may be substituted sharpened or pointed electrodes of the character indicated in Fig. 4. When the electrode terminals are in the shape of sharpened points, the sheaths 3 and 4 may be omitted, but it is highly desirable to retain them in order to force the flow of a gaseous medium being subjected to the action of the discharge in and around the electrode tips. Further, it is desired to point out that the sheaths 3 and 4 function to a large extent to protect the outer vessel 1 from the effect of heat that may be produced during the course of the reaction.

Fig. 2 is a transverse cross-sectional view taken on the line 2—2 looking in the direction of the arrows in Fig. 1 and in which the various numerals have the same significance as above set forth in the description of Fig. 1.

The reactor unit shown in Fig. 3 comprises a reactor vessel 22 provided with horizontally extending members 23 and 24 vertically extending tube-like members 25 and 26 all four of which project from the spherical member 22 and preferably lying in the same plane. Extending through the horizontal member 23 is a sheath-like member 28 which is mounted in an insulating enclosure 29. Projecting within the sheath member 28 is a low frequency electrode 30, the latter being mounted in an insulating closure member 31, which also serves as a closure for the sheath tube 28. The electrode 32 is a high frequency hot or high potential terminal electrode. Projecting through the reactor member 26 is an electrode 33, the latter being mounted in an insulating closure member 34, which also serves as a closure for the tube member 26. The electrode 33 is the ground electrode for both the high frequency circuit and the low frequency circuit, serving as a common ground.

A gaseous medium enters through the inlet conduit 34 which is centrally mounted in the reactor member 24, the latter being provided with a closure member 35. It is to be noted that the inlet member 34 preferably extends well into the discharge volume in order to insure intimate contact of the entering gaseous medium with the discharge. The reacted gaseous product passes first through the sheath 28 and then leaves the reactor by the exit conduit 36. Both the high frequency electrodes and the low frequency electrodes may consist of any of the metals or alloys herein set forth or their equivalents known to the art. The high frequency gap may vary between 15 and 25 mm. Obviously this gap may vary according to operating conditions. Instead of arranging the electrodes as shown in Fig. 3, any of the three electrodes may be the ground electrode and the other two electrodes respectively become the high frequency electrode and the low frequency electrode, and these may be interchanged so that either one is the high frequency electrode or the low frequency electrode.

It is desired to point out that the electrode tip 37 projects beyond the end 38 of the sheath. Under some circumstances, this is a desirable construction as this insures that the tip of the electrode is not subjected to the influence of any volatile constituents emanating from the interior wall of the sheath tube 28. If the sheath is made of glass it may emit active constituents, which may be sodium vapor, sodium ions and the like. There is a tendency for the results to be non-uniform if the tip 37 is enclosed within the glass sheath 38. While it is stated that sodium may be responsible for this non-uniformity, it may be caused by other constituents of the glass.

The reactor unit set forth in Fig. 4 comprises a hollow horizontal member 39 provided with horizontal legs 40 and 41 respectively. The reactor is also provided with vertically extending members 42 and 43.

Positioned within the horizontal reactor leg 40 is a sheath member 44 preferably made of glass, said sheath member being mounted in an insulating enclosure 45. Projecting through the sheath tube 44 is an electrode 45a carrying a pointed electrode terminal 46. The electrode 45a is mounted in an insulating closure member 47. Positioned within the sheath 48 is a similar electrode 49 provided with an electrode tip 50. The sheath tube 48 is mounted in the closure member 51 and is closed at its outer end with an insulating closure 52 which also functions as a mounting for the electrode 49. Positioned within the vertically extending reactor members 42 and 43 are glass sheath members 53 and 54 respectively, said members being mounted in air tight insulating closure members 55 and 56 respectively. Positioned within the sheath-like members 53 and 54 are electrodes 57 and 58 which are respectively mounted in insulating closure members 59 and 60 and which also end internally at the electrode tips 61 and 62 respectively.

Ordinarily, electrode tips 46 and 50 function as the low frequency terminals and similarly, electrode tips 61 and 62 function as the high frequency terminals with 62 the hot terminal, and 61 the ground terminal although these may be reversed. It is to be noted, however, that these may be reversed so that terminals 46 and 50 become the high frequency terminals and 61 and 62 may be low frequency terminals. It is to be noted further that when terminals 46 and 50 function as high frequency terminals either may be the hot terminal and the other the ground terminal. It is to be further noted that the four terminals 46, 50, 61 and 62 may be made of any of the materials set forth above in connection with Figures 1 and 3. It is not necessary that all four terminals be of the same material, in fact any combination of materials may be used in order to achieve the particularly desired combination of ion emission potentials.

As shown in Fig. 4, the four electrodes are all in the same plane and said plane may be a vertical plane, an horizontal plane, or any intermediate plane. It is within the province of the present invention to supplement the four electrodes as shown in Fig. 4 by an additional pair of either high frequency or low frequency electrodes. The additional pair of electroes may be of the same low frequency as is already supplied to the low frequency discharge or it may be of the same frequency as the high frequency already being supplied, or it may be of a frequency between the low frequency and the high frequency.

Referring to Fig. 4 the air, or gaseous medium being reacted, is introduced by the inlet conduit 63 of Fig. 4 and it then passes into the sheath tube 44, and then is subjected to the influence of the crossed discharge between the electrodes 46, 50, 61 and 62. The reaction product passes through the sheath 48 and out to the product recovery system through outlet conduit 64.

Referring to Fig. 5, the air or gaseous medium being reacted is dried prior to its introduction to the reactor vessel 65, by passing it through the soda-lime tube 66, then through the silica gel tube 67, thence through the conduit 68, through the orifice 69 of the differential manometer 70, through the valve 71 and thence to the reactor 65. At the point 72 is connected the mercury manometer 73 which measures the internal pressure of the reactor. From the reactor 65 the exit gases pass through the exit conduit 74 to a series of silica gel absorber tubes 75, which tubes extract the nitric oxide content of the exit gases. A vacuum is applied by means of the vacuum pump 76, and the pressure (73) and rate of flow (70) adjusted by means of the release valve 77 and the main valve 71 in the supply line. The soda-lime in tube 66 functions not only to take out a portion of the moisture but also to extract from the air substantially all of the carbon dioxide. The gaseous medium, when delivered to the reactor 65, has a moisture content of about 5 to 8 mg. of moisture per liter. When the run is started, the valves 78 and 79 are closed and valves 80 and 81 opened. When the operation has reached equilibrium, valves 78 and 79 are quickly opened and valves 80 and 81 are closed, noting the time of doing so with a stopwatch. Upon conclusion of the run, valves 80 and 81 are quickly opened and valves 78 and 79 are closed. In this way there is collected in the silica gel tube 75 the nitric oxide produced for the interval of the experiment. The weight of the silica gel tubes at the start of the experiment is deducted from the weight at the end of the experiment and the net difference is the weight of the nitric oxide produced.

Fig. 6 is similar to Fig. 5 except that it provides for converting the nitric oxide formed into nitrogen dioxide and absorbing the latter is caustic soda or caustic potash absorption tubes. The numerals 66 to 81 of Fig. 6 have the same significance as in Fig. 5, which operation is the same as there described. Gaseous product leaving the reactor 65 by conduit 74 passes into a large closed balloon flask or tank 82 which is of such a size or capacity as to permit complete conversion of the nitric oxide to nitrogen dioxide. The nitrogen dioxide leaves the flask 82 by means of conduit 83 and from thence to the caustic potash absorption system 84. The adjustment of the system and the operation of the valves are precisely the same as when using the apparatus described in Fig. 5. One modification of this apparatus hook-up that can be advantageously used, when pump 76 is a dry vacuum pump rather than an oil vacuum pump is to put the absorption tubes 84 on the far side of the pump so that the absorption therein takes place at atmospheric pressure.

Fig. 7 diagrammatically sets forth the relationship of the electrical features with respect to the reactor 65. The numeral 85 indicates the hot high frequency electrode connected to the tank circuit 86 which in turn is connected to the generator by means of the link circuit 87. The numeral 88 indicates the inductor of the tank circuit, 89 the variable condenser, and 90 the high frequency voltmeter. The tank circuit is grounded at 91. The cold or grounded electrode of the high frequency discharge is shown at 92 and it is grounded at 93 via the thermomilliammeter 94. The low frequency electrodes are shown at 95 and 96, these electrodes being connected as shown with the transformer 97 via the choke coils 98 and 99 and the milliammeter 100. The numeral 101 represents the low frequency voltmeter. The leads 102 are the primary leads from the main panel to the transformer. Fig. 7 shows the high frequency electrodes as being horizontal and the low frequency as being vertical. This may be reversed. The high frequency leads may be vertical with the hot electrode either at the top or at the bottom.

Fig. 8 is a set of curves depicting the results obtained when using the reactor set forth in Fig. 1. The abscissa indicates wave lengths, lambda λ, in meters, and the ordinate indicates the yield of nitric oxide calculated as grams of nitric acid per kilowatt hour. The curve A—B represents the yields obtained using a high frequency discharge alone, the wave length corresponding with the abscissa. The curve C—D—E represents the yield obtained when operating with a crossed discharge as is described in detail in co-pending application Serial No. 546,882. One of the discharges is generated by a 60-cycle low frequency energy, and the other discharge is generated by a high frequency energy having a wave length corresponding with the abscissa. The curves shown in Fig. 8 were obtained when using the generator hook-up shown in Fig. 15, and tank circuit shown in Fig. 17. The data of Fig. 8 were further obtained when the electrodes 18 and 19 consisted of yellow brass and the electrodes 7 and 8 were buttons of an alloy of copper (98%)-lithium (2%).

Fig. 9 is a graph depicting the results obtained when using the reactor set forth in Fig. 3 in which the electrode 30 had been removed so that there remained only the one pair of electrodes 32 and 33 to which was supplied high frequency energy having a wave length corresponding with the abscissa. The ordinate represents yield of nitric oxide calculated as grams of nitric acid per kilowatt hour. The electrode terminals 32 and 33 were of nickel. The generator hook-up used is shown in Fig. 15 and the tank circuit used is shown in Fig. 18.

Fig. 10 is a graph depicting the results obtained when using the reactor set forth in Fig. 4 in which the vertical electrodes 57 and 58 had been removed and the electrodes 45A and 49 were supplied with high frequency energy of a wave length corresponding to the abscissa. The ordinate represents the yield of nitric oxide calculated as grams of nitric acid per kilowatt hour. The electrodes 45A and 49 consisted of tantalum and the generator hook-up used to provide the high frequency energy is shown in Fig. 15 and the tank circuit is shown in Fig. 18.

Fig. 11 is a graph depicting the results when using a crossed discharge in a reactor such as is set forth in Fig. 4. All four electrodes were sharply pointed tips of the alloy copper (98%)-lithium (2%). The horizontal electrodes 46 and 50 were supplied with 60-cycle low frequency electrical energy. Of the high frequency terminals 61 and 62 the terminal 62 was the hot terminal, while 61 was the cold or ground terminal. The wave length of the high frequency energy supplied corresponded with the abscissa while the ordinate gives the yield of nitric oxide calculated as grams of nitric acid per kilowatt hour. The generator hook-up is shown in Fig. 15 and the tank circuit is set forth in Fig. 18.

Fig. 12 is a graph depicting the results obtained when using the crossed discharge in the reactor such as is set forth in Fig. 4, wherein all four of the electrode tips 46, 50, 61 and 62 are of tantalum. Sixty-cycle electrical energy is supplied to the horizontal electrodes. High frequency energy of a wave length corresponding with the abscissa is supplied to the vertical electrodes in which the lower terminal 62 is the hot electrode and the upper terminal 61 is the cold or ground electrode. The generator hook-up used to supply the high frequency energy is that set forth in Fig. 15 and the tank circuit in Fig. 18.

Fig. 13 is a graph depicting the results obtained when using a crossed discharge in a reactor of the type set forth in Fig. 4 wherein the horizontal electrode terminals 46 and 50 were of brass supplied with 60-cycle low frequency energy and the vertical electrode terminals 61 and 62 were of nickel, terminal 62 being supplied with high frequency energy of a wave length corresponding with the abscissa, while electrode terminal 61 was the cold or ground high frequency terminal. The ordinate represents the yield of nitric oxide calculated as grams of nitric acid per kilowatt hour. The energy was supplied by a generator of the type seht forth in Fig. 15 while the tank circuit used is set forth in Fig. 18. The nitric oxide was collected in an absorber bulb of the type set forth in Fig. 6. It was subsequently found that the flask 82 provided for the conversion of nitric oxide to nitrogen dioxide was not large enough to permit complete conversion and hence, although all points on the curve are relatively correct, they are, on an absolute basis all of them low.

Fig. 14 is a graph depicting the results obtained when using a crossed discharge in a reactor of the type set forth in Fig. 4 in which all four electrode terminals are of the same alloy, namely, copper (98%)-lithium (2%). Sixty-cycle low frequency electrical energy is supplied to the horizontal electrodes while high frequency energy, of a wave length corresponding with the abscissa, was supplied to the lower of the vertical electrode, the upper one being the cold or ground electrode. The product was absorbed in silica gel tubes as set forth in Figure 5. The generator used in supplying the high frequency is that shown in Fig. 16 while the tank circuit used is that set forth in Fig. 18.

Fig. 15 sets forth the hook-up of one of the high frequency generator units used for producing the high frequency energy supplied to the tank circuit and shown in various curves herein set forth where the frequency lies between the limits of 20 meters or 15 mc. and 175 meters or 1.71 mc. The diagram may be divided into four circuits, 103, 104, 105, and 106. Circuit 103 is the full wave rectification unit wherein the leads 107 connect to the 110 volt 60-cycle supply on the panel board. Numeral 108 identifies a transformer delivering its secondary high voltage current to the two rectification tubes 109 and 110, the filaments of which are heated by current generated in the filament transformer 111. The resistor 113 and the fixed condenser 114, together with a choke coil 112, constitute a filter. The high voltage D. C. current produced by this circuit leaves same by means of the ground connection 115 and the lead 116, which delivers to the plate of tubes 117 and 118. The desired frequency is obtained by means of tuning the oscillator circuit 104, such tuning being effected by operation of the variable condenser 120 and the inductance 121.

In carrying out the work described herein between the limits of wave length of 20 meters or 15 mc. and 175 meters or 1.71 mc., it is necessary to change the size of the inductance 121 by steps. This is done by removing one inductance and replacing same with another inductance having the desired characteristics. The minor circuit 122 is a coupling circuit, coupling the oscillator circuit 104 to the grid in-put circuit 123 of the power amplifier circuit 105. The grid circuit of the power amplifier is tuned by means of a variable condenser 124 and by changing inductance coils 123 in a manner similar to the change effected in inductance 121, as necessary to meet requirements. The combination of resistor 125 and condenser 126, both of which are grounded, serve to minimize or eliminate parasitic oscillations that might render the output less monochromatic. The resistor 127 provides grid bias for the power amplifier tubes 128 and 129. Transformer 130 provides power for the filaments of the power tubes 128 and 129. These tubes amplify power provided by circuit 106, imparting thereto the frequency developed by the oscillator tubes 117 and 118. Transformer 131, connected with a 110 volt supply, provides the energy to the power supply rectification tubes 132 and 133. Transformer 134, also connected with a 110 volt supply provides the power for the filaments of the tubes 132 and 133. It will be observed that the circuit 106 is essentially similar to the circuit 103. The combination of the choke 135, fixed condenser 136, and resistor 137 constitutes a filter. The rectified power leaves the circuit via the thermomilliammeter 138 to ground and lead 139 to the power amplifier circuit 105. The voltage at which it is delivered is measured by the voltmeter 140.

The meters 138 and 140 are accordingly the meters referred to in some of the examples as being in the power amplifier plate circuit and on which the early calculations were based. The power amplifier circuit 105 is tuned to the desired frequency as generated by means of the oscillator tubes 117 and 118 of oscillator circuit 104 by means of the variable condenser 141 and the inductance 142. The inductance 142 is varied by means of changing coils to meet various wave length requirements as is done in the case of inductances 121 and 123. The power amplifier circuit 105 thus tuned and supplied by D. C. power from circuit 106 transmits the amplified high frequency energy to the coupling circuit 143, which in turn delivers it to a tank circuit such as is shown in Fig. 17 or Fig. 18.

Fig. 16 sets forth the hook-up of the high frequency generator used where the wave length of the high frequency used is between the limits of 175 meters or 1.71 mc. and 620 meters or 0.484 mc. This hook-up is similar in many respects to the hook-up of the generator set forth in Fig. 15, there being however two fundamental differences. There are five circuits, 144, 145, 146, 147 and 148 instead of four circuits shown in Fig. 15. Circuit 144 is entirely similar to circuit 103 of Fig. 15, and circuit 147 is entirely similar to circuit 106 of Fig. 15, inasmuch as the respective components are the same and the respective functions are the same, and hence these will not again be described in detail here. The high voltage D. C. current produced by circuits 144 leaves the same by means of the ground connection 149 via the thermomilliammeter 150 and the lead 151, which delivers to the plates of the tubes 152 and 153 of the oscillator circuit 145. The transformer 154, connected with the 110 volt supply, provides the filament power for the tubes 152 and 153. The desired frequency is obtained by means of tuning the oscillator circuit 145, such tuning being effected by the operation of the variable condenser 155 and the inductance 156.

In carrying out the work herein described between the limits of 175 meters or 1.71 mc. and 620 meters or 0.484 mc., it is necessary to change the size of the inductance 156 by steps. This is done by shifting taps along the inductor to obtain the desired inductance.

It will be noted that this hook-up does not utilize the link circuit 122 of Fig. 15 for connecting the oscillator circuit 145 with the power amplifier circuit 146. Instead of the link circuit, the oscillator circuit 145 is directly connected to the power amplifier circuit 146 through the fixed condensers 157 and 158. These condensers 157 and 158 couple the oscillator circuit 145 to the grid in-put circuit 159 of the power amplifier circuit 146. The plate circuit of the power amplifier is tuned by means of the variable condenser 160, and by shifting taps along the inductor to obtain the desired inductance. The choke coils 162 and 163 in the grid circuit of the power amplifier serve to keep the high frequency energy from entering the grid bias circuit 148 while forming a low resistance path for the negative grid bias D. C. voltage. High frequency energy from the oscillator circuit 145 is applied to the grids of the power amplifier tubes 164 and 165 which are supplied D. C. power through the lead 166 from the power rectifier circuit 147. Condensers 167 and 168 are neutralizing condensers which balance out the internal grid-plate capacity of the power amplifier which prevent oscillation of the power amplifier. Transformer 169 supplies filament power for the tubes 164 and 165, condensers 170 and 171 by-passing the high frequency currents to the ground.

The tubes 164 and 165 amplify power provided by circuit 147, imparting thereto the frequency developed by oscillator tubes 152 and 153.

Circuit 148 is the D. C. bias supplying a negative voltage to the grids of the tubes 164 and 165 of the power amplifier circuits 146. The numeral 172 designates a split transformer supplying power to the plates of the full wave rectification tube 173. The choke coil 174, condensers 175 and 176, together with the resistor 177, constitutes a filter. The positive terminal of this supply is grounded at 178, the negative voltage being supplied to the grids of the power amplifier tubes 164 and 165 by means of the lead 179 via the thermomilliammeter 180.

The power amplifier circuit 146 is tuned to a desired frequency as generated by means of oscillator tubes 152 and 153 of the oscillator circuit 145 by means of the variable condenser 160 and inductance 161. The inductance 161 is varied by shifting taps along the inductor to obtain the desired inductance. The power amplifier circuit 146 thus tuned and supplied by D. C. power from circuit 147 transmits the amplified high frequency energy to the coupling circuit 181, which in turn delivers it to a tank circuit such as is shown in either Fig. 17 or 18.

Fig. 17 depicts a tank circuit of the type known as center grounded. It was used in all of the earlier work without either thermomilliammeter or high frequency voltmeter being included as these instruments could not be procured at the time. Referring to Figures 15 and 16, it should be noted that the portion of the coupling circuits there shown as 143 in Fig. 15 and 181 in Fig. 16 leads to and is a part of the coupling circuit 182 of Fig. 17 or 183 of Fig. 18. Either type of tank circuit shown in Figs. 17 and 18 may be used with either of the generators set forth in Figures 15 and 16. The coupling circuits 143—182, 143—183, 181—182, and 181—183, serve merely to transfer the high frequency energy from the generator set to the tank circuit proper.

The tank circuit of Fig. 17 consists of the inductance 184 which is center grounded at 185 and the variable condenser 186. The point 187 in the circuit is the location of the high frequency discharge. The tank circuit is tuned to the frequency produced by the generator by use of the variable condenser 186 and by changing inductance coils 184, as has previously been described in connection with the generator, Fig. 15 to meet requirements. The circuit conductors 188 are preferably of copper tubing. Operation of the tank circuit is carried out by standard and well-known procedures.

Fig. 18 represents a tank circuit of the type known as end grounded. The coupling circuit 183 supplies the energy from the generator and is connected in the same manner as is the coupling circuit 182 of Fig. 17, except that it is placed at the end of the inductance 190 instead of in the center. It will be further noted that in this type of tank circuit the ground 191 is at the end of the tank coil 190 instead of in the middle as shown at 185 in Fig. 17. The point 192 is the location of the discharge, as was the point 187 in Fig. 17. Tuning of this tank circuit to the generator circuit is carried out in a manner precisely the same as when tuning the tank circuit shown in Fig. 17, namely, by means of the variable condenser 193 and by changing the inductance 190 to meet requirements. As in the case of Fig. 17 the circuit conductors 194 are preferably of copper tubing. When this type of tank circuit was used, instruments had become available so that a thermomilliammeter 195 was installed and a high frequency voltmeter 196.

Fig. 19 is a graph depicting the results obtained when using a crossed discharge in a reactor of the type set forth in Fig. 4, in which all four electrode terminals are of the same alloy, namely, copper (98%)-lithium (2%). Sixty-cycle low frequency electrical energy is supplied to the horizontal electrodes while high frequency energy, of a wave length corresponding with the abscissa, was supplied to the lower of the vertical electrodes, the upper one being the cold or ground electrode. The gaseous product was absorbed in silica gel tubes as set forth in Fig. 5. The generator used in supplying the high frequency is that shown in Fig. 16 and the tank circuit used is that set forth in Fig. 18.

Fig. 20 is a graph depicting the results obtained when using the reactor set forth in Fig. 4 in which the vertical electrodes 57 and 58 have been removed and the electrodes 45a and 49 were supplied with high frequency energy of a wave length corresponding to the abscissa. The ordinate represents the yield of nitric oxide calculated as grams of nitric acid per kilowatt hour. The electrodes 45a and 49 consisted of the metal columbium and the generator hook-up used to provide the high frequency energy is shown in Fig. 15 and the tank circuit used is shown in Fig. 18.

Fig. 21 sets forth graphically the relationship between results obtained working with high frequency alone and the results obtained when using crossed discharges when using tantalum electrodes. Portions of Figures 10 and 12 between the wave length limits of 15 and 95 meters are replotted in Fig. 21 to the same set of coordinates. The broken or dashed curves represent the results obtained when using high frequency alone and peak A is a gas peak and peak B is an electrode peak. When using crossed discharges from four tantalum electrodes we get the results set forth with the solid line and the one single high and broad peak C. It will be noted that peaks A and B have been merged together and simultaneously spread to cover an appreciably wider band. It will be further noted that the base line M—N for the discharge of the high frequency alone is also considerably raised when changing to the crossed discharge and appears as M'—N'. The comparison sets forth clearly the advantages of crossed discharges as compared with high frequency alone, particularly when the higher frequency component corresponds with critical frequencies.

However, it is again pointed out that the yield of various electrochemically transformed products obtained when using a crossed discharge are greater even though one or both of the frequencies are not critical frequencies.

In Figure 22, in which there is set forth the essential features of one type of impulse generator, the hook-up comprises the high voltage source of energy 197, one side of which is grounded at 198 and the other side of which is connected to the plate 199 of the thyratron tube 200. Thyratrons 200 and 201 serve as the valves, the period of time between whose operation partially determines the period of the impulse. The magnitude of the impulse is partially determined by the variable condenser 202, one terminal of which is grounded at 203 and the other terminal of which is connected to a point in the electrical lead 204 connecting the thyratron 200 and the plate 213 of the thyratron 201. The grid 205 of thyratron 200 together with the transformer 206, the battery 207 and the filament 208 of thyratron 200 constitute a circuit which triggers the functioning of thyratron 200. Likewise, the circuit comprising the grid 209, transformer 210, battery 211 and filament 212, functions to trigger thyratron 201. The impulse of magnitude and periodicity thus developed leaves the generator by the lead 214, passes through the chemical reactor 215 and thereafter to ground 216. The reactor 215 may be of the character shown in Figures 1, 3, or 4 of the drawings, although it is not limited thereto.

An appartus of the character shown in Figure 22, delivers a D. C. current having a given periodicity or repetition period and having a given magnitude of impulse. The number of impulses per second is the periodicity of the discharge current, and the magnitude of the impulse may be thought of and considered in terms of its "equivalent wave length." By equivalent wave length is meant that frequency of a sinusoidal wave which has the same energy content calculated as erg-seconds as the impulse in question. It may be stated that the magnitude of energy delivered by an A. C. current having any frequency, including those herein set forth, is the quantum of the sinusoidal wave length, said quantum being, as is well known, the product $hf$, where $h$ is the well known Planck's constant, and $f$ is frequency. In the range of very high frequencies, as, for example, in the visible portion of the electromagnetic spectrum, this quantum is otherwise known as the photon.

The present invention will be illustrated by a number of examples which illustrate how the data was obtained for the plotting of specific points on certain curves herein set forth. It is to be understood that these examples are merely illustrative of the present invention and that the latter is not limited to the specific methods set forth.

In general it may be stated that the data for the plotting of any specific curve is obtained by making a series of experiments and keeping all conditions of operations constant throughout the entire series of experiments, except the one condition of wave length, frequency or energy quantum. Each curve was plotted from a number of points, the data for which was obtained by increasing or decreasing the wave length, frequency, or energy quantum, step by step, for example, keeping all conditions substantially constant, except the wave length. A series of experiments were run reducing or increasing the wave length by two to four meters at a time and in each case the yield of the nitric oxide was determined, said nitric oxide being calculated as grams of nitric acid per kilowatt hour for each particular wave length use.

*Example I*

The results of the following experiment furnish the data for the plotting of the point R shown on the curve of Fig. 11. In carrying out the experiment the gas discharge apparatus or reactor used is set forth in Fig. 4. All four electrodes are an alloy of 98% copper and 2% lithium. The diameter of each leg of the reactor vessel is 32 mm. and the inner sheaths are 23 mm. in diameter. The over-all length of the reactor is approximately 10 inches. The treatment of the air prior to its entry into the reactor and subsequent to its exit from the reactor is set forth in Fig. 5. The generator used in this experiment is the hook-up set forth in Fig. 15 and the tank circuit used is that set forth in Fig. 18. The relation of the reactor to the various electrical components of the set-up is that shown in Fig. 7 except that the high frequency electrodes are the vertical electrodes and the low frequency, the horizontal. Actually, it appears to make very little difference which pair of electrodes are vertical and which are horizontal.

When starting the run the pump 76 in Fig. 5 is started, having previously closed halves 78 and 79 and opened valves 80 and 81. Valves 71 and 77 are then so operated as to give simultaneously the desired rate of flow as indicated by the manometer 70 and the desired pressure in the reactor as indicated by manometer 73. The air before entering the reactor is passed first through the soda-lime tube 66 to remove its moisture content, and incidentally its carbon dioxide content, and then through the silica gel tube 67 in order to remove constituents of the air that might be absorbed by the silica gel absorber 75 and which would otherwise render the results erroneous. The moisture content is thus reduced to 5 to 8 mg. per liter. In this experiment the rate of flow was adjusted to 510 cc. per minute calculated to standard conditions and the pressure within the reactor was adjusted to 335 mm. pressure. The air entering the reactor had a temperature of 26.8° C.

There is then applied to the high frequency electrode terminals 61 and 62 high frequency energy having a voltage, before striking, of approximately 1800, said voltage dropping immediately on striking of the discharge to 300 volts, with a corresponding current of 16 milliamperes. The high frequency energy is supplied with a frequency of 2.17 mc. (138.2 meters). The lower terminal 62 is made the hot terminal, that is it is connected to the generator as is the terminal 85 of Fig. 7. The upper terminal 61 is the cold or ground terminal as is the terminal 92 of Fig. 7 and it is grounded via thermomilliammeter shown as numeral 94 in Fig. 7. The horizontal terminals 46 and 50 are the low frequency terminals and are connected into the low frequency 60-cycle circuit as are terminals 95 and 96 of Fig. 7. The high frequency gap between the electrode terminal 61 and 62 is 17 mm.; and the low frequency gap between electrode terminals 46 and 50 is 28 mm. To the low frequency electrodes 46 and 50 the low frequency energy, having a frequency of 60-cycles, is applied under a potential of approximately 2000 volts, which immediately drops to 440 volts when the discharge is started, the latter being accompanied by a current of 20 milliamperes. The high frequency energy thus corresponds with 5 watts, whereas the low frequency energy corresponds with 9 watts, the total being 14 watts, of which approximately 36% is high frequency energy.

After the rate of flow, the pressure in the reactor, and the discharge in the reactor have been adjusted as described above the apparatus is permitted to run via the by-pass 80 and 81 for five minutes to establish an equilibrium in the system. After the apparatus has come to equilibrium the valves 78 and 79 are quickly opened while valves 80 and 81 are closed, noting the time of doing so by starting the stop-watch. The run was allowed to proceed exactly six minutes at which time the valves 80 and 81 were quickly opened and valves 78 and 79 closed. During the six minutes in which the flow of the exit gases from the reactor passed through the silica gel absorber tubes, 75, there were absorbed 184.0 milligrams of nitric oxide. This weight of nitric oxide is the difference in weight of the silica gel absorber tubes 75 before and after the run.

To render the results still more accurate the silica gel tubes were prepared in advance by subjecting them for one hour to the desired rate of flow and the desired pressure but without the discharge being operated. This evacuation permitted the removal of any traces of moisture or condensable gases in or on the silica gel that might be removed during the course of the experiment and thus introduce an error into the result. The silica gel absorber tubes were all equipped with stop-cocks. As soon as the pressure had been brought back to atmospheric in both the case of the pre-treatment and in the case of the experiment by admitting air that had passed through the preliminary soda-lime and silica gel tubes 66 and 67, the stop-cocks were then closed before removing them for weighing.

The 184.0 milligrams of nitric oxide obtained in this experiment corresponds to a yield of 276.0 grams of nitric acid per kilowatt hour.

It is desired to point out that the concentration of nitric oxide in the exit gas was 4.48% NO. This compares with approximately 1.5% normally obtained in discharge processes and with 40% which is the theoretical maximum concentration when treating air. This process permits obtaining abnormally high nitric oxide concentrations as illustrated not only by this experiment but in all of the experiments herein given, going to as high as 26.5% in experiment VII.

In the experiments which follow, the procedure is essentially the same as has been described in experiment I except where noted to the contrary.

*Example II*

The results of the following example furnish the data for the plotting of the point S shown on the curve of Fig. 11. In carrying out this experiment the apparatus and mode of operation is precisely the same as in Example I, which details are not repeated. In this experiment the rate of flow was likewise 510 cc. per minute calculated to standard conditions and the pressure within the reactor was adjusted to 334 mm. mercury pressure.

The crossed discharge was started as was described in experiment I and it was noted that the high frequency energy had a voltage of 300 volts, 16 milliamperes current and a power of 5 watts. The high frequency energy is supplied at a frequency of 2.09 mc. (143.5 meters). Both the high frequency and low frequency gaps were the same as in experiment I. The low frequency energy was supplied at 440 volts and 20 milliamperes, the power being nine watts. The total power was 14 watts, of which approximately 36% is high frequency energy. The time during which the exit gas from the reactor was passed through the silica gel absorber tube 75 in Fig. 5 was six minutes, during which six minutes there was collected 180.6 milligrams of nitric oxide. The results calculated to a yield of 270.9 grams of nitric oxide calculated as grams of nitric acid per kilowatt hour. Likewise, the concentration of nitric oxide in the exit gases amounted to 4.41% NO.

*Example III*

The results of the following example furnish the data for the plotting of the point T shown on the curve of Fig. 10. In this case the crossed discharge was not used but only high frequency energy alone. The experiment was carried out in a reactor of the type set forth in Fig. 4 after removal of the vertical electrodes 61 and 62 and applying the high frequency energy to the horizontal electrodes 46 and 50. The gaseous medium was admitted through inlet 63 as indicated. Electrode terminal 46 was made the hot or high potential terminal and electrode 50 the cold or low potential terminal. Both electrodes were of tantalum. The dimensions of the reactor were the same as set forth in Example I. The treatment of the air prior to its entry to the reactor and subsequent to its exit from the reactor is set forth in Fig. 5. The generator used in this experiment is the hook-up set forth in Fig. 15 and the tank circuit is that set forth in Fig. 18. The relation between the reactor and the various electrical components of the set-up is that shown in Fig. 7 except that all low frequency connections are removed.

The method of preparing the silica gel in advance by evacuation, the starting of the run, its operation, and the method of completing the run is precisely that set forth in Example I. The electrode gap was 20 mm. The striking voltage was 2000 which immediately dropped to 500 volts at 61 milliamperes equivalent to 30 watts of energy. The rate of flow was adjusted to 382 cc. per minute calculated to standard conditions and the pressure within the reactor was 337 mm. The high frequency energy is supplied at a frequency of 6.18 mc. (48.5 meters). The time of operation with the flow of gases passing through the silica gel absorbers 75 in Fig. 5 was six minutes.

There were collected in the silica gel absorber tubes 75 of Fig. 5, 118.7 milligrams of nitric oxide. This corresponds to a yield of 83.0 grams of nitric acid per kilowatt hour. The concentration of nitric oxide gas in the exit gases amounted to 4.08%.

*Example IV*

The results of the following experiment furnished the data for the plotting of the point U shown on the curve Fig. 12. In carrying out this experiment the reactor set forth in Fig. 4 was used and all dimensions are the same as in Example I. This experiment employs the crossed discharge, all four electrodes being of tantalum. The treatment of the air prior to its entry into the reactor and subsequent to its exit from the reactor is set forth in Fig. 5. The generator used in this experiment is the hook-up set forth in Fig. 15 and the tank circuit used is that set forth in Fig. 18. The relation of the reactor to the various electrical components of the set-up is that shown in Fig. 7.

The preparation of the silica gel absorber tubes and the conditions of operation were all identical with those of Example I.

When the crossed discharge is operating at equilibrium, the meters indicate that the high frequency component is at 250 volts with a current of 44 milliamperes and energy of 11 watts. The low frequency component was observed to be operating at 1000 volts, at 20 milliamperes and with an energy of 20 watts. The total watts employed was thus 31 watts of which approximately 35% was high frequency energy. The high frequency energy is supplied at a frequency of 8.98 mc. (33.4 meters). The low frequency energy supplied was the standard 60-cycle current. The duration of the experiment was 6 minutes. The horizontal gap which corresponds to the high frequency discharge was 11 mm. and the vertical gap was 25 mm. The rate of flow was adjusted to 562 cc. per minute standard conditions and the pressure in the reactor was adjusted to 335 mm.

There were collected in the absorber tubes 179.1 milligrams of nitric oxide. This calculates to a yield of 140.5 grams of nitric oxide calculated as nitric acid per kilowatt hour. The concentration of nitric oxide in the exit gases, based upon the above data, amounted to 3.96% of nitric oxide by volume.

*Example V*

The result of the following experiment furnished the data for the plotting of the point V shown on the curve of Fig. 14. In carrying out this experiment the reactor set forth in Fig. 4 is used. A crossed discharge is employed in which all four electrodes are of an alloy of 98% copper and 2% lithium. The dimensions of the reactor parts are the same as set forth in Example I. The treatment of the air prior to its entrance into the reactor and subsequent to its exit therefrom is as previously described, utilizing the apparatus of Fig. 5. The generator circuit used in this experiment is the hook-up set forth in Fig. 16 and the tank circuit used is in accordance with the hook-up set forth in Fig. 18. The relation of the reactor to the various electrical components of the set-up is that shown in Fig. 7 except the high frequency electrodes are the vertical electrodes and the low frequency, the horizontal.

The preparation of the silica absorber tubes 75 of Fig. 5, and the conditions of operation were all identical with those of Example I.

When the crossed discharge is operating at equilibrium the meters indicate that the high frequency component is at 400 volts with a current of 35 milliamperes and an energy of 14 watts. The low frequency component was observed to be operating at 750 volts, at a current of 25 milliamperes, and with an energy of 18 watts. The total watts employed is 32 watts of which approximately 43% is high frequency energy. The high frequency energy is supplied at a frequency of 1.39 mc. (215.0 meters). The low frequency energy supplied is the standard 60-cycle. The duration of the experiment is six minutes. The horizontal gap which corresponds to the low frequency discharge is 37 mm. and the vertical gap corresponding to the high frequency discharge is 27 mm. The rate of flow is adjusted to 540 cc. per minute, standard conditions and the pressure in the reactor is adjusted to 327 mm.

There were collected in the absorber 236.6 milligrams of nitric oxide. This calculates to a yield of 186.7 grams of nitric acid per kilowatt hour. The concentration of nitric oxide in the exit gases, based upon the above data, amounts to 5.4% of nitric oxide by volume.

*Example VI*

The results of the following experiment furnished the data for the plotting of the point W shown on the curve of Fig. 13. In carrying out this experiment the reactor set forth in Fig. 4 is used, the dimensions of all parts of same being those set forth in Example I. The relation of the reactor to the various electrical components of the set-up is that shown in Fig. 7, except that the high frequency electrodes are the vertical electrodes with the hot electrode at the bottom and the cold electrode at the top, and the low frequency electrodes are horizontal. The horizontal low frequency electrodes consist of sharply pointed brass tips. The vertical high frequency electrodes consist of sharply pointed nickel rods. The treatment of the air prior to its entry into the reactor and subsequent to its exit from the reactor is set forth in Fig. 6. It will be observed that the treatment of the air prior to entry into the reactor is the same in this example as in the preceding five examples. The recovery of the nitric oxide used, however, is radically different in that, instead of absorbing the nitric oxide in silica gel, it is first converted to nitrogen dioxide and nitrogen tetroxide, and then absorbed in an accurately measured amount of standardized sodium hydroxide solution. After the run the excess sodium hydroxide is titrated. It is desired to point out that it was subsequently found that the balloon flask 82 of Fig. 6 that was used was much too small so that the conversion of the nitric oxide to nitrogen dioxide was far from complete. Hence, although all points on the curve shown in Fig. 13 are very much too low on an absolute basis, they are, nevertheless, relatively correct and do bring out the precise location of the critical bands which are the subject matter of the present invention.

Further, as will be indicated in the discussion that follows under the conditions of this experiment a gas peak occurs only with crossed discharges and not with a high frequency discharge alone.

The starting of the run and the conditions of operation were all identical with those of Example I, except for the necessarily altered details contingent upon the substitution of caustic soda absorbers for silica gel absorbers as a means of collecting and measuring the nitric oxide.

The generator hook-up and the tank circuit utilized in carrying out this experiment is set forth in Fig. 15 and Fig. 17, respectively. It is to be noted that in the tank circuit of Fig. 17 there is neither a high frequency voltmeter or a thermomilliammeter for the reason that at the time that this tank circuit was used, such meters could not be procured. It was, therefore, necessary to use, when measuring the high frequency energy supplied to the crossed discharge, the power amplifier readings from the generator set as shown by the thermomilliammeter 138 of Fig. 15 and the voltmeter 140 of Fig. 15. It will be readily understood that these readings, while relatively correct, will nevertheless read far too high in power assumed to be delivered at the discharge which in turn will make the calculated value of yield of nitric acid per kilowatt hour much too low.

When the crossed discharge is operating at equilibrium the power amplifier voltmeter 140 of Fig. 15 indicates a voltage of 2300 volts and the thermomilliammeter 138 of Fig. 15 indicates 30 milliamperes. Hence, the high frequency energy delivered at the discharge was assumed to be 69 watts. Simultaneously the low frequency component, measured in the normal manner, is operating at 900 volts and 90 milliamperes or at 81 watts. The total watts are thus 150 watts measured in the manner described. In this instance the calculations of the percentage delivered as high frequency energy would be of but little significance. The high frequency energy is supplied at a frequency of 3.99 mc. (75.2 meters). The low frequency energy is the standard 60-cycle. The duration of the experiment is 6 minutes. The horizontal low frequency gap is 16 mm. and the vertical high frequency gap is 19 mm. The rate of flow is adjusted to 550 cc. per minute calculated to standard conditions and the pressure within the reactor is adjusted to 735 mm. which is almost atmospheric pressure. The yield may be greatly increased by decreasing the pressure to about 0.4 of an atmosphere.

To the absorber there is charged 100 cc. of .4853 N/l sodium hydroxide solution. The unreacted excess sodium hydroxide solution is titrated at the end of the run and the difference calculated to 13.0 grams of nitric acid per kilowatt hour. As has been pointed out, however, this is low due to—

(a) The necessity for using power amplifier meter readings;

(b) Too small a conversion flask 82 of Fig. 6;

(c) Working at a pressure higher than optimum.

As has already been pointed out these results are included here solely because they are relatively correct and clearly indicate the location of the critical frequencies.

Example VII

The results of the following experiment furnished the data for the plotting of the point Y shown on the curve of Fig. 8. In carrying out this experiment the reactor set forth in Fig. 1 is used in which a crossed discharge is employed consisting of three internal electrodes and one external electrode. The horizontal electrodes 5 and 6 of Fig. 1 are the low frequency electrodes and their terminals 7 and 8 consist of the perforated buttons of the alloy 98% copper and 2% lithium. The upper electrode 16 is the hot high frequency electrode and consists of sharply pointed one-eighth inch yellow brass rod. The lower external electrode 18, which is the cold or ground electrode, consists of copper.

For this reactor the diameter of the horizontal tube is 32 mm. and of the inner sheath tubes 3 and 4, is 23 mm. The diameter of the vertical member approximates 8 mm.

The treatment of the air prior to its entrance into the reactor and subsequent to its exit therefrom is as previously described, utilizing the apparatus of Fig. 5.

The generator used in this experiment is the hook-up set forth in Fig. 15 and the tank circuit used is that set forth in Fig. 17. As in the case of Example VI, it is to be noted that in the tank circuit of Fig. 17 there is neither a high frequency voltmeter or a thermomilliammeter. It was necessary to use the power amplifier instrument readings. Further, as in Example VI, the use of the power amplifier instrument readings, while not effecting the relative accuracy of the results, does greatly reduce their numerical value.

The preparation of the silica gel absorption tubes 15 of Fig. 5 and the conditions of operation were all identical with those of Example I.

When the crossed discharge is operating at equilibrium, the power amplifier voltmeter, 140 of Fig. 15, indicates a voltage of 2050 and the thermomilliammeter, 138 of Fig. 15, indicates 90 milliamperes. Hence, the high frequency energy delivered at the discharge is assumed to be 189 watts. Simultaneously, the low frequency component, measured in the normal manner, operated at 800 volts and 120 milliamperes or at 96 watts. The total watts are thus 285 measured in the manner described. The high frequency energy is supplied at a frequency of 2.11 mc. (142.1 meters). The low frequency energy is the standard sixty-cycle. The duration of the experiment is 2.33 minutes. The horizontal low frequency gap is 60 mm. The rate of flow is 356 cc. per minute calculated to standard conditions, and the pressure within the reactor is 174 mm. mercury. The use of higher pressures improves the yield.

The increase in weight of the silica gel in the 2.33 minute interval is 259.0 milligrams. This calculates to 78.0 grams of nitric acid per kilowatt hour, assuming delivery to the discharge of a total of 285 watts which is high. The corrected yield would be enormously higher, but the figures as actually obtained are set forth. The concentration of nitric oxide in the exit gases based on the above data, is 26.5% nitric oxide.

The following Table I sets forth the tabulation of critical wave length bands in meters for the conversion of air to nitric oxide.

The following Table II sets forth a similar tabulation where the critical frequency bands are expressed in megacycles or ergs of energy.

The following Table III correlates the three methods of measuring the critical discharge magnitudes when the latter are measured in ergs of energy, frequencies, and wave lengths, respectively.

Table I.—Tabulation of critical wave length bands in meters for conversion of air to nitric oxide CRITICAL WAVE LENGTHS IN METERS
[Note: Broad bands are in parentheses]

| Fig. | Peak wave lengths in meters | 18 | 33.5 | 36 | 67 | 71 | 89 | 100 |
|---|---|---|---|---|---|---|---|---|
|  | Preferred Band | 17-19 | 30-35 | 31-41 | 62-72 | 66-76 | 80-98 | 95-105 |
|  | Nature of Critical Band | Gas | Electrode | Gas | Electrode | Gas | Electrode | Electrode |
| 8 | Crossed Discharge, Cu-Li and Brass. H. F. Discharge Alone, 2 Tantalum Electrodes |  | 30-35 (19-45) |  |  |  |  |  |
| 8 | H. F. Discharge Alone, Brass Electrodes |  |  |  |  |  |  |  |
| 19 | Crossed Discharge, 4 Cu-Li Electrodes |  |  |  |  |  |  |  |
| 20 | H. F. Discharge Alone, 2-Columbium Electrodes |  |  | 31-41 (25-65) |  |  | 80-98 (78-115) |  |
| 9 | H. F. Discharge Alone, 2 Nickel Electrodes |  |  | 34-38 (18-70) |  |  |  |  |
| 10 | H. F. Discharge Alone, 2 Tantalum Electrodes |  |  | 35-40 (19-51) | 65-70 (52-79) |  |  | 98-103 (80-109) |
|  | Crossed Discharge, 4 Cu-Li Electrodes | 17-19 (15-21) |  |  |  |  |  |  |
| 11 | Crossed Discharge, 4 Cu-Li Electrodes |  |  | 35-85 | | | | |
| 12 | Crossed Discharge, 4 Tantalum Electrodes |  |  | (15-90) | | | | |
| 13 | Crossed Discharge, 2 L. F. Brass; 2 H. F. Nickel |  |  | 30-37 (19-51) |  | 68-71 (60-85) |  |  |
| 14 | Crossed Discharge, 4 Cu-Li Electrodes |  |  |  |  |  |  |  |

Table I.—Tabulation of critical wave length bands in meters for conversion of air to nitric oxide—Continued

CRITICAL WAVE LENGTHS IN METERS

[Note: Broad bands are in parentheses]

| Fig. | | 130 | 142 | 169 | 215 | 285 | 576 |
|---|---|---|---|---|---|---|---|
| | Peak wave lengths in meters | 130 | 142 | 169 | 215 | 285 | 576 |
| | Preferred Band | 125–135 | 137–147 | 164–174 | 190–240 | 280–290 | 565–580 |
| | Nature of Critical Band | | Gas | Electrode | | Gas | Gas |
| 8 | Crossed Discharge, Cu-Li and Brass | | 137–142 (120–175) | | | | |
| 8 | H. F. Discharge Alone, 2 Tantalum Electrodes / H. F. Discharge Alone, Brass Electrodes | | 135–145 (125–170) | | | | |
| 19 | Crossed Discharge, 4 Cu-Li Electrodes | | | | | 280–290 (265–305) | |
| 20 | H. F. Discharge Alone, 2-Columbium Electrodes | | 137–147 (115–165) | | | | |
| 9 | H. F. Discharge Alone, 2 Nickel Electrodes | | 137–142 (125–165) | | | | |
| 10 | H. F. Discharge Alone, 2 Tantalum Electrodes | | 137–142 (110–155) | 167–172 (156–180) | | | |
| | Crossed Discharge, 4 Cu-Li Electrodes | | | | | | 565–570 (540–590) |
| 11 | Crossed Discharge, 4 Cu-Li Electrodes | | 135–145 (121–159) | | | | |
| 12 | Crossed Discharge, 4 Tantalum Electrodes | | | | | | |
| 13 | Crossed Discharge, 2 L. F. Brass; 2 H. F. Nickel | 128–132 (100–170) | | | | | |
| 14 | Crossed Discharge, 4 Cu-Li Electrodes | | | | 200–225 (188–250) | | |

Table II.—Tabulation of critical frequency or energy bands in megacycles or ergs for conversion of air to nitric oxide, each of the megacycle figures are to be multiplied by $k(6.554 \times 10^{-21})$ to convert megacycles to ergs

CRITICAL FREQUENCY BANDS EXPRESSED IN MEGACYCLES

[Note: Broad Bands are in Parentheses]

| Fig. | | 16.7 | 8.96 | 8.34 | 4.48 | 4.22 | 3.37 | 3.00 |
|---|---|---|---|---|---|---|---|---|
| | Peak Frequencies in Megacycles | 16.7 | 8.96 | 8.34 | 4.48 | 4.22 | 3.37 | 3.00 |
| | Preferred Frequency Band (frequencies in megacycles) | 17.6–15.8 | 10.0–8.57 | 9.68–7.32 | 4.84–4.16 | 4.54–3.95 | 3.75–3.06 | 3.16–2.86 |
| | Nature of Critical Band | Gas | Electrode | Gas | Electrode | Gas | Electrode | Electrode |
| 8 | Crossed Discharge, Cu-Li and Brass | | | | | | | |
| | H. F. Discharge Alone, Brass Electrodes | | | | | | | |
| 19 | Crossed Discharge, 4 Cu-Li Electrodes | | | | | | | |
| 20 | H. F. Discharge Alone, 2-Columbium Electrodes | | | 9.68–7.32 (12.04–4.62) | | | 3.75–3.06 (3.85–2.61) | |
| 9 | H. F. Discharge Alone, 2 Nickel Electrodes | | | 8.83–7.89 (16.7–4.03) | | | | |
| 10 | H. F. Discharge Alone, 2 Tantalum Electrodes | | 10.0–8.57 (15.8–6.67) | 8.50–7.50 (15.8–5.88) | 4.62–4.29 (5.77–3.79) | | | 3.06–2.91 (3.75–2.75) |
| | Crossed Discharges, 4-Cu-Li Electrodes | 17.6–15.8 (20.0–14.3) | | | | | | |
| 11 | Crossed Discharges, 4 Cu-Li Electrodes | | | | | | | |
| 12 | Crossed Discharges, 4 Tantalum Electrodes | ←——— 8.59–3.53 (20.0–3.33) ———→ | | | | | | |
| 13 | Crossed Discharges, 2 L. F. Brass; 2 H. F. Nickel | | | 10.0–8.11 (15.8–5.88) | | 4.41–4.22 (5.00–3.53) | | |
| 14 | Crossed Discharges, 4 Cu-Li Electrodes | | | | | | | |

| Fig. | | 2.31 | 2.11 | 1.77 | 1.39 | 1.05 | 0.521 |
|---|---|---|---|---|---|---|---|
| | Peak Frequencies in Megacycles | 2.31 | 2.11 | 1.77 | 1.39 | 1.05 | 0.521 |
| | Preferred Frequency Band (frequencies in megacycles) | 2.40–2.22 | 2.19–2.04 | 1.83–1.72 | 1.58–1.25 | 1.07–1.03 | .531–.517 |
| | Nature of Critical Band | | Gas | Electrode | | Gas | Gas |
| 8 | Crossed Discharge, Cu-Li and Brass | | 2.19–2.11 (2.50–1.72) | | | | |
| | H. F. Discharge Alone, Brass Electrodes | | 2.22–2.07 (2.40–1.77) | | | | |
| 19 | Crossed Discharge, 4 Cu-Li Electrodes | | | | | 1.07–1.03 (1.13–9.83) | |
| 20 | H. F. Discharge Alone, 2-Columbium Electrodes | | 2.19–2.04 (2.61–1.82) | | | | |
| 9 | H. F. Discharge, 2 Nickel Electrodes | | 2.19–2.11 (2.40–1.82) | | | | |
| 10 | H. F. Discharge Alone, 2 Tantalum Electrodes | | 2.19–2.04 (2.07–1.94) | 1.80–1.74 (1.92–1.67) | | | |
| | Crossed Discharges, 4 Cu-Li Electrodes | | | | | | .531–.526 (.556–.504) |
| 11 | Crossed Discharges, 4 Cu-Li Electrodes | | 2.22–2.07 (2.48–1.88) | | | | |
| 12 | Crossed Discharges, 4 Tantalum Electrodes | | | | | | |
| 13 | Crossed Discharges, 2 L. F. Brass; 2 H. F. Nickel | 2.35–2.27 (3.00–1.77) | | | | | |
| 14 | Crossed Discharges, 4 Cu-Li Electrodes | | | | 1.50–1.29 (1.59–1.20) | | |

Table III

Use of exponential expression $2^n c$ and $2^n f$ and $2^n l$ where $c$ is a critical energy quantum in ergs; and where $f$ is a critical frequency in megacycles; and where $l$ is a critical wave length in meters; and $n$ is any integer from $-10$ to $+10$ including zero.

| $2^n c$ | $2^n f$ | $2^n l$ |
|---|---|---|
| let $c = \frac{300k}{18} = 16.7k$ | let $f = \frac{300}{18} = 16.7$ | let $l = 18$ |
| $n=0$   $2^n c = 16.7k$ | $n=0$   $2^n f = 16.7$ | $n=0$   $2^n l = 18$ |
| $n=-1$  $2^n c = 8.34k$ | $n=-1$  $2^n f = 8.34$ | $n=1$   $2^n l = 36$ |
| $n=-2$  $2^n c = 4.17k$ | $n=-2$  $2^n f = 4.17$ | $n=2$   $2^n l = 72$ |
| $n=-3$  $2^n c = 2.08k$ | $n=-3$  $2^n f = 2.08$ | $n=3$   $2^n l = 144$ |
| $n=-4$  $2^n c = 1.04k$ | $n=-4$  $2^n f = 1.04$ | $n=4$   $2^n l = 288$ |
| $n=-5$  $2^n c = 0.522k$ | $n=-5$  $2^n f = 0.522$ | $n=5$   $2^n l = 576$ |

Referring to Table I, it is to be noted that there is set forth a series of critical bands, some of which are critical "gas peak" bands and some of which are critical "electrode peak" bands. Certain wave lengths or certain wave bands produce peak gas yields of electrochemically transformed products and these are related as herein set forth. Certain wave lengths or wave bands produce electrode peaks and these are related as herein set forth. Usually, the wave lengths or wave bands which produce the gas peaks are different from the wave lengths or wave bands which produce the electrode peaks but in some cases the wave lengths or wave bands which produce the gas peaks and the wave lengths and wave bands which produce the electrode peaks coincide or substantially coincide or the respective gas peak wave bands and electrode peak wave bands overlap and when this coincidence or overlapping occurs then the resulting yield is greater than it would have been had all conditions of operation remained constant and the reaction gas itself had only been activated by the gas peak frequency. The "super" yield herein referred to is that yield which results from the activation of the gas simultaneously by the gas peak frequency and the ions resulting from the activation of the electrode material by the electrode peak frequency. This is clearly brought out in Fig. 21 which, in turn, is a combination of Figures 10 and 12. Referring to Fig. 21, the curves shown in dotted lines represent the yield obtained in grams of nitric oxide calculated as nitric acid per kilowatt hour when using high frequency alone and tantalum electrodes, A being a gas peak and B being an electrode peak.

In order to obtain curve C shown in Fig. 21, an electrical discharge generated by energy having a wave length there set forth was crossed with a low frequency 60-cycle discharge, all four of the electrodes being tantalum electrodes. As indicated on the drawing, a gas peak A and the electrode peak B are both broadened and enhanced so that after merging under the influence of the crossed discharge the results assume the form of the curve C indicated by the solid line.

It should be noted, further, that the base line M—N is raised to occupy the position of the base line M'—N'.

Referring to Table I it is to be noted that there is set forth gas peak wave bands of 17 to 19 meters; 31 to 41 meters; 66 to 76 meters; 137 to 147 meters; 280 to 296 meters; and 565 to 580 meters.

These wave length bands when expressed in megacycles become, as shown in Table II 17.6 to 15.8; 9.68 to 7.32; 4.54 to 3.95; 2.19 to 2.04; 1.07 to 1.03; and 0.531 to 0.517. Multiplying these figures by K $(6.554 \times 10^{-21})$ expresses the megacycles as ergs of energy.

As shown in Table I the weighted average of these wave length bands are, respectively, in meters, 18, 36, 71, 142, 285 and 576.

Referring to Table II where the wave length bands are expressed in megacycles, the weighted averages become 16.7, 8.34, 4.22, 2.11, 1.05 and 0.521. Multiplying these figures by $k$ $$(6.554 \times 10^{-21})$$

expresses the megacycles as ergs of energy.

Referring to Table I, the weighted average wave bands are related each to the other by the exponential expression $2^n l$, where $l$ is any of the weighted average wave bands and $n$ is any one of the integers from $-10$ to $+10$ including zero.

Referring to Table II, the weighted average energy bands, expressed in megacycles, are related each to the other by the exponential expression $2^n c$ in the case of energy measured in ergs per second, and $2^n f$ in the case of frequency measured in megacycles.

The relationship between these various formulae is set forth in Table III where the values in any horizontal line are equivalents. To illustrate, for instance, it should be noted that a wave length of 18 meters is equivalent to $$\frac{300}{18} = 16.7$$

megacycles. If, then, in the expression $2^n l$, $l$ is equal to 18 and $n$ is equal to 2, there results the calculated critical wave length of 72 meters which corresponds to the experimentally obtained wave length, as brought out in Table I, of 71 meters. Thus, the calculated value is the same as the experimental value within the limits of experimental error. Correspondingly, if the critical frequency $f$ be made equal to 16.7 megacycles and $n$ be made equal to $-2$ there is obtained the critical frequency of 4.17 megacycles, which compares with 4.22 megacycles as obtained experimentally. Thus, the calculated frequency is the same as the experimentally found frequency within the limits of experimental error. It should be noted that a wave length of 72 meters is merely another way of expressing a frequency of 4.17 megacycles. It should be further noted that inasmuch as the frequency in megacycles is at all times the same as the energy content in ergs that the corresponding expression $2^n c$, where $c$ is $16.7k$ and $n$ is $-2$, likewise, comes out to equal $4.17k$ ergs of energy.

Therefore, in accordance with the present invention if for a given gaseous material one peak gas yield is obtained then the gas reaction may be effected to produce transformed products with peak yields at other frequencies which can be determined in advance by utilizing any one of the exponential expressions.

For example, in the conversion of air to nitric oxide, wherein the air is treated with a plurality of electrical discharges which cross each other and which emanate from separately spaced electrodes, it was ascertained that a peak yield was produced when the critical electrical discharge was generated by energy having a wave length of 36 meters. While applicant by many experiments and arduous labor extending over a number of years finally worked out various wave lengths at which peak gas yields were produced, it now becomes, because of applicant's endeavors, relatively easy to operate at predetermined wave lengths which will be known in advance of said operation to produce gas peak yields. This is brought about by applicant's contribution whereby the peak gas yields may be determined in advance using the exponential expression $2^n l$, or its equivalent expressions $2^n c$ or $2^n f$. Utilizing the exponential expression $2^n l$ and using a wave length of 36 meters as $l$, where there is formed one peak gas yield in the conversion of air to nitric oxide by crossed discharges; then, the remaining critical wave lengths may be calculated at which peak yields may be produced, when said critical wave lengths are crossed with other wave lengths either larger or smaller, as shown in the following Table IV.

*Table IV*

Utilizing the exponential expression $2^n l$, for gas peaks, where $l$ is 36 meters and $n$ varies from −3 to +6:

| | |
|---|---|
| $(2^{-3})$ 36=4.5 | $(2^2)$ 36=144 |
| $(2^{-2})$ 36=9 | $(2^3)$ 36=288 |
| $(2^{-1})$ 36=18 | $(2^4)$ 36=576 |
| $(2^0)$ 36=36 | $(2^5)$ 36=1152 |
| $(2^{+1})$ 36=72 | $(2^6)$ 36=2308 |

Referring to the above Table IV, it is to be noted that when the exponential expression is +3 there is a peak yield of nitric oxide at 288 meters; when $n$ is +2 there is a peak yield at 144 meters; when $n$ is +1 there is a peak yield at 72; when $n$ is zero there is a peak yield at 36 and when $n$ is −1 there is a peak yield at 18. All of this has been established by inventive research.

While in the table the highest exponent used is 6, the table can be augmented by using numerically larger exponents, up to 10. When the exponent 7 is used, the critical wave length is 4616 meters; when the exponent 8 is used the critical wave length is 9232 meters; when the exponent 9 is used the critical wave length is 18,464 meters.

In connection with the above Table IV it may be pointed out that 576 meters corresponds to a frequency of approximately .521 magacycle. When this is crossed with cyclic energy having a frequency of 60 cycles per second a gas peak yield of nitric oxide is produced but the best yield obtainable is less than the best yield obtainable when 60-cycle energy is crossed with a frequency of 2.11 megacycles.

As the 60-cycle discharge, or its equivalent, as herein set forth, is crossed with an electrical discharge having increased critical frequencies the yield progressively increases except in the instance when one of these frequencies is crossed with a critical electrode frequency, when the progressive increase is interrupted and the increase is much greater than the normal increase, due to the additive benefit of the critical electrode frequency. For example, when using crossed discharges the yield of nitric oxide will be greater when using 72 meters than when using 144; greater when using 36 than when using 72 meters; greater when using 18 than when using 36 meters; greater when using 9 meters than when using 18 meters; and greater when using 4½ meters than when using 9 meters.

As a practical matter, 142 meters is selected as a frequency of one of the crossed discharges because equipment is presently available, but as the art of generator design progresses, the art will shift successively from the use of generators capable of producing 142 meters to generators capable of producing 72 meters, 36 meters, 18 meters and even lower.

It may be stated that the critical gas peak bands are independent of electrode material, and independent of whether or not the discharge is a high frequency discharge alone or a crossed discharge.

It is to be noted that there is a peak band which is obtained only when operating with crossed discharges of the character herein set forth, said band lying between the limits of 66 to 76 meters. The reason why a peak gas yield is not obtained when using a wave band lying between 66 to 76 meters is not known. It may be due to some particular circumstance but from the facts as they appear at the present time it is an exception to the general rule when using a high frequency discharge alone.

It is desired to point out that the lines MN and M′ N′ shown in the Figures 8, 9, 10, 11, 12, 13, 14, 19 and 20, constitute what is known as the "base line" which line runs through the low points between peaks. Without prejudicing this invention it is stated as being believed that that portion of the total yield represented by the fraction of ordinate below the base line is the yield resulting from collisions between electrons and ions, between ions and ions, and between either electrons and ions with neutral atoms, radicals or molecules in the classically accepted manner. That portion of the total yield corresponding to the ordinate lying above the base line and within a gas peak is believed to be the result of resonance absorption of energy as photons. That portion of the total yield corresponding to the ordinate above the base line in an electrode peak is the result of some sort of ionic emission from the electrodes, due to the specific frequency employed, which emission then activates the gas molecules in accordance with classical concepts. There would thus be ionic emission from metals characterized by critical frequencies and playing a role corresponding to thermionic emission and the photoelectric effect.

The preferred material of the electrodes will depend to a substantial extent upon the minimum sustaining voltage required to maintain the discharge, for the reason that the minimum sustaining voltage required, for particular metals, has been found to be a periodic function of the atomic number of said metal in the same manner as is many of the properties of the elements. Further, in the case of a binary alloy of two metals, the minimum sustaining voltage required to maintain a continuous discharge has been found to decrease to a minimum after which it again rises as the composition of the alloy changes from 100% of one component to 100% of the other component. The electrode terminals may be in the form of buttons, globules, nodules, sharp points of varying angles or any other of the well-known equivalents. When working with critical frequencies corresponding to gas peaks, which critical bands are independent of the electrode materials, the electrode material may consist of copper, copper alloys, silver, silver alloys, iron, iron alloys, nickel, nickel alloys, chromium, chromium alloys, tantalum, tantalum alloys, tungsten, or tungsten alloys. Among the specific alloys that may be used for electrode materials may be copper (98%)-lithium (2%), copper (98%)-beryllium (2%), lead (98%)-lithium (2%), lead (96%)-lithium (4%), zinc (98%)-lead (2%), zinc (93.4%)-lithium (6.6%).

Referring to Tables I and II it is to be noted that in the conversion of air to nitric oxide using a high frequency discharge alone and using tantalum electrodes, that peak yields are obtained on other than the critical gas peak yields. Tables I and II show high frequency discharges alone and using tantalum electrodes peak electrode yields at 30 to 35 meters, 65 to 70 meters, 98 to 103 meters, 167 to 172 meters.

It is desired to point out that the time interval between the formation of the nitrogen oxides and their absorption by silica gel is only a small fraction of a second, so that of the total nitrogen oxides only a negligible amount, that is, less than 1%, is present as nitrogen dioxide $NO_2$ or nitrogen tetroxide $N_2O_4$. That this is the case is indicated further by the fact that the silica gel retains its almost white color. This is further substantiated by the fact that the reaction is carried out at appreciably sub-atmospheric pressures.

Referring to Examples I to VII, inclusive, after completion of the run and the weight in milligrams of nitric oxide obtained has been determined, the calculation is made by the following equation:

$$\frac{\text{Mg. NO} \times \text{mol. wt. HNO}_3 \times 1000}{\text{Time (hrs)} \times \text{mol. wt. NO} \times \text{watts} \times \text{power factor}}$$

$= $ grams nitric acid per kilowatt hour

In this equation the milligrams of nitric oxide, the time in hours, and the watts are determined experimentally and substituted. In all of the calculations relative to the above experiments the power factor has been taken as being 1.00. The significance of this assumption of a 1.00 power factor is considerable. When working with a 60-cycle discharge alone the power factor normally approximates .98. That is, the true results are approximately 2% greater than when assuming a power factor of 1.00. When working with high frequency discharges alone, discharges which are not of the crossed discharge type, the power factor depends on both the frequency and the electrical characteristics of the circuit. In all cases investigated, power factors have normally ranged from approximately .60 to .12. It will be readily seen, therefore, that had the power factor been determined and in each case inserted into the denominator of the equation in making the calculations, the true yields would have been significantly higher than were reported. Such a situation exists as regards the curve AB of Fig. 8, the curve shown in Fig. 9 and the set of curves shown in Fig. 10, all of which curves utilized the high frequency discharge alone.

It has been further found that the power factor is at a minimum as a critical peak frequency is approached. Were this abnormally low power factor actually measured and used in the calculation, the true height of the peaks and likewise, the true magnitude of the yields, using critical frequencies, would be obtained and these true values would, in the cases herein disclosed, be as much as eight to ten times the values actually reported. The reason for assuming a power factor of 1.00 throughout all calculations herein given, is that the determination of the power factor of a crossed discharge presents new and unexpected difficulties, which have not as yet been solved. It is tentatively believed that the power factor of most of the crossed discharges herein disclosed range from approximately 0.3 to 0.7 but that for any given curve, remains substantially constant when the curve is on the base line and decreases as a critical frequency band is approached. Thus, all claims of yield made on the basis of figures disclosed are conservative, and if the true power factor were known and used in the calculation, not only would the base lines MN and M' N' be substantially raised but the peaks would be raised to show an even greater percentage increase in yield.

It may be pointed out that the power factor appears to approximate 0.7 when operating at the base line and decreases to about 0.3 when the gaseous medium as, for example, air, is electrochemically transformed as, for example, to nitric oxide, at critical peak wave band lengths.

The appearance of the high frequency discharge alone is well known. If horizontal electrodes are used the discharge tends somewhat upwardly. If vertical electrodes are used there will be no arching effect. In either case, if the frequency is where the curve meets or rests on the base line MN, the discharge will appear stringy with a pronounced whitish-blue core and very little glow around it. As the frequency is changed so that it comes within the range of a critical frequency band, the discharge expands greatly in volume and the core becomes less pronounced. In such cases, if the electrodes are horizontal, it appears much like a fuzzy caterpillar and may be called a "Caterpillar Discharge." In this connection it is desired to point out that as the frequency passes through the range of a critical gas or electrode band, not only the physical appearance of the discharge changes, as just noted, but that the power consumption decreases and simultaneously the weight yield increases. Without prejudicing the present invention, it is believed that this is related to the decreasing energy density of the discharge, as is more fully discussed below. When working the crossed discharges, the appearance and electrical characteristic of the luminous crossed discharges indicate that it cannot be classed as a glow discharge, or as an arc discharge, or as a corona discharge. It appears to be a new type of discharge distinct in its appearance and electrical characteristics from all other types of discharges heretofore reported. Its appearance may vary considerably without losing the advantage of the luminous crossed discharge. However, in its most effective form, it appears somewhat as does a glow discharge in that a soft, luminous light pervades the entire volume of the reactor or gas discharge apparatus between the electrode tips and the confining walls of the gas discharge apparatus, and frequently appearing for as much as ½ of an inch to ¾ of an inch behind the electrode tips. Maximum luminosity is at the center of the crossed discharges and it gradually decreases until the confining boundaries of the gas discharge apparatus are reached. In the formation of nitric oxide from air, this condition is reached at a pressure in the reactor of approximately 335 mm. mercury. With higher pressures the discharge begins to show traces of stringy cores crossing between the two pairs of electrodes tips, and when this occurs the yield of product calculated as grams of nitric acid per kilowatt hour tends to fall off. Again, in the preferred form, the crossed discharges are operated with a minimum sustaining energy and of this, 35% to 65% is preferably of the large quantum component, providing this is the critical energy component. In this connection, it is desired to point out that it is the critical energy component which produces peak yields of a given transformed product and should be supplied in an amount which, for good yields, is at least 6% of the total energy supplied and preferably is, about 35% to 65% of the total energy supplied, it being pointed out later that the basic principles of the present invention may be employed utilizing crossed discharges even when the critical energy component which produces a peak yield is less than 6% of the total energy supplied. By maintaining all operating conditions, other than the wave lengths and/or the proportion of the critical energy component and then varying either the wave length or the proportion of the critical energy component supplied to the crossed discharge the yield may be varied, or both of these factors may be varied to vary the yield. As the proportion of electrical components beyond these limits is increased or decreased, the discharge begins to show the crossed, stringy cores, as indicated above, and simultaneously the yield starts to decrease to less than the maximum.

It is desired to point out that the rate of flow of the air through the gas discharge apparatus, if above the critical minimum previously discussed, does not appreciably affect the luminous or electrical characteristics of the discharge. In the preferred form, the luminous crossed discharge is a relatively cold discharge as is evidenced by:

(a) The exit gases formed in the production of nitric oxide are seldom more than 2° or 3° in temperature higher than the gas entering the reactor which normally is 20° to 30° C. Where the crossed discharges are operated at critical frequencies as above set forth, the difference in temperature between the entering and exit gases may not exceed more than a fraction of a degree centigrade and, in many cases, there frequently has been an actual drop in temperature of the gas in passing through the crossed discharge zone.

(b) An optical pyrometer trained on the discharge volume through a quartz window in the wall of the gas discharge apparatus indicates a temperature, within the limits of accuracy of a pyrometer, substantially the same as for the entering gases.

(c) Metallic lithium melts at 186° C. A piece of metallic lithium cut to have sharp edges can be inserted into the discharge space as a probe or intermediate electrode without having its edges even slightly rounded.

The temperature limit of 186° C. is illustrative of the cold state in the production of nitric oxide by subjecting air to the action of a plurality of electrical discharges which cross each other and which emanate from separately spaced electrodes, one of said electrical discharges being a critical discharge. Higher temperatures may be used provided there is no substantial decomposition of the reaction product. Therefore, it is not desired to be limited strictly, when producing nitric oxide, to temperatures of 186° C. or 200° C. as the upper temperature limit. Some of the advantages, from the standpoint of the yield, may be obtained if the reaction temperature is maintained below about 500° C. It is desired to state that at 200° C. there is little decomposition of nitric oxide. While there is somewhat more decomposition at temperatures between 200° C. and 500° C. it is recognized that the temperature of reaction may be maintained at 500° C. or between room temperature and 500° C.

The point is here made that the reaction temperature when producing nitric oxide may be considerably above 500° C. and still there will be an increased yield of nitric oxide than what can be produced by present day methods.

It has been stated that the present invention is not limited, from the standpoint of critical frequencies used, to the production of nitric oxide, for example, there are critical frequencies or critical energy quanta all related as herein set forth for the oxidation of sulphur dioxide to sulphur trioxide, using the critical frequency or critical energy component alone or by crossing the same with a noncritical energy component or frequency. Sulphur dioxide is stable at temperatures even as high as 2,000° C., and therefore, it is not necessarily required that the reaction gas be maintained at a temperature below 2,000° C., although temperature control does offer other advantages. Utilizing the principles of the present invention and employing one of the critical energy quanta or one of the critical frequencies and using the same by itself or crossed with another frequency which may be critical or noncritical, sulphur dioxide may be oxidized to sulphur trioxide at room temperatures, that is, about 20 to 30° C. However, broadly stated, it is within the province of the present invention to effect the oxidization of sulphur dioxide, utilizing the critical energy component or critical frequency, to sulphur trioxide, at temperatures below 600° C. Likewise, carbon monoxide may be oxidized to carbon dioxide with practically all of the statements made in connection with sulphur dioxide oxidation to sulphur trioxide applying.

The principles of the present invention also apply to the reaction of air and methane. To produce formaldehyde, utilizing critical frequencies which are related as herein set forth, the critical frequency being used alone or crossed as herein set forth. In the production of formaldehyde and other aldehydes, the lower frequency energy may be 10 to 25 or 60 cycles and, preferably, below 1,000 cycles and this may be combined with a critical frequency.

Ozone may be produced in accordance with the principles of the present invention by subjecting substantially pure oxygen to the action of one of a series of critical frequencies, these frequencies all being related in accordance with the exponential expression herein set forth.

The conditions above set forth as regard discharge temperatures, and energy densities as set forth below, are the preferred conditions, especially in the case of those reactions where the higher temperature tends to decompose the product formed. It is not intended that these preferred conditions serve as limitations, as numerous benefits exist where higher temperatures are used. The high temperatures may be obtained by operating with more than minimum sustaining energy and with correspondingly higher temperatures such as 800° C. to 1,000° C.

In a reactor of the type set forth in Fig. 1 it has been frequently observed, under conditions not exactly the preferred, that the high frequency component emanating from the middle internal electrode may show a deep blue corona discharge, while surrounding it may be a soft luminous discharge emanating from the pair of low frequency electrodes. Even so, the yields appear to be excellent under these conditions although not quite as good as under the preferred conditions that have been set forth. By a slight adjustment to bring the conditions into line with preferred conditions the outlines of the corona discharge disappears and the two discharges then melt into one another as a single soft luminous discharge.

In the examples herein set forth the reaction is carried out below atmospheric pressure. However, it is within the province of the present invention to carry out the reactions using atmospheric pressure or super-atmospheric pressure.

It is within the scope of this invention to use air, enriched with oxygen, in lieu of air as the gaseous medium being reacted. It is within the scope of this invention to use any synthetic mixture of nitrogen and oxygen and also to use mixtures of nitrogen and oxygen with other gases providing the additional gases do not significantly affect the yield or quality of the nitric oxide adversely.

It has been discovered that, when using a crossed discharge to treat gaseous material and a particular frequency for preferred yields there is a critical lower limit for the velocity of the air that is passing through the reactor vessel. If the velocity of flow of the air or any other gaseous material passing through the reactor vessel is decreased below this minimum, then, for the given high frequency used, the yields are rapidly reduced. On the other hand, if the velocity of the gaseous material passing through the reactor vessel is increased above this minimum critical velocity, the increase in yield is relatively small and does not at all correspond to the increase in velocity.

For example, for a given set of operating conditions where all variables remain constant, including the percentage of high frequency energy to the total energy, if the velocity is decreased 10% below the critical minimum value, there is approximately a 10% decrease in the yield obtained. However, if the velocity is increased 10% over the critical velocity, there is no corresponding 10% increase in yield. Not only does this relationship hold for crossed discharges but it also holds when the gaseous material is subjected to the action of a high frequency discharge alone, that is, when it is not crossed with a low frequency discharge. The relationship of velocity of gas being reacted to yield is more fully set forth in co-pending application Ser. No. 546,882.

The gap between the high frequency electrodes and the gap between the low frequency electrodes, as set forth in the various examples, are by way of illustration and not by way of limitation. The gap in a pilot plant installation may be as long as four to six inches with a corresponding increase in voltage as for illustration, 30,000 volts. Likewise, the gaps in a full scale installation may approximate ten to fourteen inches long with correspondingly high voltages, to as high as 100,000 to 150,000 volts.

It is desired to point out, in connection with the crossed discharge, that there exists as interrelationship between minimum sustaining voltage, minimum sustaining energy, volume of the luminous discharge, the temperature of the discharge and the energy density. Without prejudicing this invention it is believed that the peculiar and particular virtues of the crossed discharge are the result of a low energy density, lower than has heretofore been observed in the case of any kind of a luminous discharge. By energy density is meant watts per cubic centimeter of luminous discharge. This low energy density is achieved as a result of crossing the discharges in the manner described in this invention. It has been observed for example that a 60-cycle low frequency discharge of approximately 60-watts energy content will occupy a luminous discharge volume of about one cc. Hence, in this case the energy density would approximate 60-watts per cc. On the other hand, for a high frequency discharge, operating at 120 meters wave length and with 60 watts energy, the volume of the luminous discharge will approximate three cc. In other words, the energy density in this case approximates twenty watts per cc. Finally, for a crossed discharge, of which 30 watts is supplied by a 60-cycle low frequency energy and 30 watts by 120 meter wave length high frequency energy, the volume of the luminous discharge will be in excess of 20 cc., so that in this case the energy density will be three watts or less per cc. If, now, the high frequency component selected should be a critical frequency as set forth in detail in Examples I or II, the energy density will be even less than three watts per cc. As an illustration of this, if, instead of using a high frequency component of 120 meters, a component of the critical frequency 142 meters wave length in the case of nitric oxide production be used, then the total visible volume of the crossed discharge will exceed 60 cc. In this case, therefore, the energy density will be less than one watt per cc. of luminous volume.

It is desired to point out that there apparently is but little or no relationship between the observations of low temperature and low energy density on the one hand and the observation as to whether or not the electrode terminals glow brilliantly or do not glow at all. Columbium terminals nearly always glow brilliantly regardless of operating conditions. Tantalum terminals usually exhibit a dull glow. Nickel, copper, and copper-lithium alloy terminals seldom glow under the preferred conditions.

It is desired to point out, in the case of either the high frequency discharge alone or when using the crossed discharge, that if the discharge be extinguished, that is converted from a luminous to a silent or dark discharge, that surprisingly high currents still flow and that surprisingly high yields of nitric oxide calculated as grams of nitric acid per kilowatt hour are obtained. It has further been found that in such silent or dark discharges, the benefits of the use of both crossed discharges and of critical frequencies still exist.

Referring to Table I, it is to be noted that when using tantalum electrodes there is an "electrode peak" at 33.5 meters and succeeding electrode peaks at 67 meters, 100 meters and 169 meters. These "electrode peaks" were obtained in the production of nitric oxide from air when using a cyclic discharge alone and tantalum electrodes. It is noted that the critical wave length of 33½ meters is an average of the wave band of 30 to 35 meters. This electrode peak begins to assert itself at 19 meters and reaches its greatest magnitude at 33½ meters, falling off again until 45 meters is reached. Stated differently, the figures 19 and 45 meters represent the points where the electrode peak curve intercepts the base line MN. Similarly, the electrode peak wave length of 67 meters represent a weighted average of 65 to 70 meters. Here, again, critical electrode peak wave length begins to assert itself at about 52 meters and reaches its greatest magnitude at 67 meters. Then it begins to fall away until it intercepts the base line MN at 79 meters. Similarly, the critical electrode peak wave length of 169 meters represents the weighted average of 167 meters and 172 meters. These critical wave lengths when expressed in megacycles, as shown in Tables II and VI, are 8.96, 4.48, 2.97 and 1.79. When these wave lengths are expressed in ergs as shown in Tables II and VI, the values are 8.96 k, 4.48 k, 2.97 k, and 1.79 k. Referring to Table I, the weighted average electrode wave lengths are related to each other by the following formula: $(1+2^n)l$, where $l$ is the critical wave length in meters and $n$ is any one of the 10 positive integers including zero.

Referring to Tables I, II and VI, the weighted average energy components expressed in megacycles or ergs, are related to each other by the respective formulae, $$\frac{ck}{1+2^n} \text{ and } \frac{f}{1+2^n}$$

where $ck$ is the critical energy quantum in ergs and $f$ is the critical frequency in megacycles. Here, again, $n$ is any one of the ten positive integers including zero.

Having once determined, for a given electrode material, one critical wave length which produces an electrode peak yield then other critical wave lengths may be calculated where the given electrode material such as, for example, tantalum, will produce an increase in yield of the final electrochemically transformed product, regardless of the nature of the reacting gaseous media. For example, having experimentally determined that for tantalum there is a peak yield of the electrochemically transformed product at 33.5 meters, in accordance with the present invention it can immediately be forecast that there will be peak electrode yields at 101.5 meters, 167.5 meters, 301.5 meters, 569.5 meters, 1105.5 meters and 2177.5 meters, these figures being determined by using the formula $(1+2^n) l$, as set forth in Table VI.

It is to be noted that the calculated critical electrode peak wave length is approximately the same as the experimentally found electrode peak wave length.

It is desired to point out that the critical electrode peak wave lengths or frequencies are always obtained when a given pure metallic electrode material is used, and that the electrode peaks are independent of the nature of the gaseous media being reacted. There will be one series of critical electrode peaks related by the formulae set forth for tantalum, another for columbium, another for copper and another for each of the pure metal electrodes, regardless of the nature of the metals.

In accordance with the present invention, for the transformation of a given gaseous medium, as, for example, the transformation of air to nitric oxide, using a single pair of electrodes and uncrossed, quantized energy, as, for example, frequencies between the range of 1 and 15 megacycles, it may be determined where critical gas peak yields of nitric oxide are produced and then for one of these critical wave bands or wave lengths or critical energy quantum, there is selected an electrode which has a critical electrode wave length, frequency or energy quantum, identical with or substantially identical with the critical gas peak, wave length, frequency or energy quantum, then, the respective critical gas peak energy quantum, frequency, or wave length may be crossed with the critical electrode peak energy quantum or frequency or wave length and then there results super peak yields which are substantially additive of the gas peak yield and the electrode peak yield. This will be further multiplied by the factor which is responsible for the increase in yield when two separate energy quanta frequencies or wave lengths are crossed as herein set forth.

This is well illustrated by referring to Fig. 10 in which band C encompasses both the critical gas frequencies of 36 meters and the critical electrode frequency of 33.5 meters.

The 130 meter band is an anomaly. It does not fit into the gas peak series for air. It cannot be an electrode peak for any one of the components of brass, for if this were so it would have shown up on the curve given on Fig. 8. Neither can it be an electrode peak frequency for nickel for if so it would have shown up in the curve of Fig. 9.

The 215 meter peak shown in Fig. 14, is not a gas peak as it does not fit into the exponential expression for gas peaks of air. It may be an electrode peak for either copper or lithium. This, however, could only be confirmed by repeating the work in this range with electrodes other than the copper lithium alloy that was used.

The 71 meter gas peak band is unique in that it appears only in the case of crossed discharge and not in any one of the three cases where a high frequency discharge alone was used.

Tables V and VI above referred to and which follow clearly set forth how the electrode peaks may be calculated when one of a series of electrode peaks has been ascertained.

Table VI sets forth the equivalency of the peaks, expressed in meters, ergs and megacycles.

*Table V*

Utilizing the exponential expression $(1+2^n) l$ for electrode peaks, where $l$ is 33.5 meters, characteristic of tantalum electrodes and $n$ varies from zero to +6:

$(1+2^0) \times 33.5 = 67.0$ meters
$(1+2^1) \times 33.5 = 101.5$ meters
$1+2^2) \times 33.5 = 167.5$ meters
$(1+2^3) \times 33.5 = 301.5$ meters
$(1+2^4) \times 33.5 = 569.5$ meters
$(1+2^5) \times 33.5 = 1105.5$ meters
$(1+2^6) \times 33.5 = 2177.5$ meters

*Table VI*

Use of exponential expressions $$(1+2^n)l, \frac{ck}{(1+2^n)} \text{ and } \frac{f}{(1+2^n)}$$

in calculating critical electrode quanta, where:

$ck$ is a critical energy quanta in ergs
$f$ is a critical frequency in megacycles; and
$l$ is a critical wave length in meters; and
$n$ is any one of the ten integers including zero.

| $(1+2^n)l$ | $\frac{ck}{(1+2^n)}$ | $\frac{f}{(1+2^n)}$ |
|---|---|---|
| let $l$=the critical wave length of 33.5 meters | 33.5 meters is equivalent to 8.96$k$ ergs $\frac{300k}{33.5}=8.96k=ck$ | 33.5 meters is equivalent to 8.96 megacycles $\frac{300}{33.5}=8.96=f$ |
| Meters | $ck$ Ergs | $f$ Megacycles |
| $n=(1+2^n)l= 67.0$ | $n=0(1+2^n)=4.48k$ | $n=0(1+2^n)=4.48$ |
| $n=(1+2^n)l= 101.5$ | $n=1(1+2^n)=2.97k$ | $n=1(1+2^n)=2.97$ |
| $n=(1+2^n)l= 167.5$ | $n=2(1+2^n)=1.79k$ | $n=2(1+2^n)=1.79$ |
| $n=(1+2^n)l= 301.5$ | $n=3(1+2^n)=0.995k$ | $n=3(1+2^n)=0.995$ |
| $n=(1+2^n)l= 569.5$ | $n=4(1+2^n)=0.527k$ | $n=4(1+2^n)=0.527$ |
| $n=(1+2^n)l=1105.5$ | $n=5(1+2^n)=0.271k$ | $n=5(1+2^n)=0.271$ |
| $n=(1+2^n)l=2177.5$ | $n=6(1+2^n)=0.138k$ | $n=6(1+2^n)=0.138$ |

It should be noted that in the above table all values in the same horizontal line are equivalent. In the above table the energy in ergs is equal to the frequency in megacycles multiplied by $k$ $(6.554 \times 10^{-21})$.

It is within the province of the present invention to supply one pair of electrodes with substantially sinusoidal energy and cross the discharge generated thereby with the discharge generated by an impulse generator. Either discharge may be the high energy quanta. For example, a 60-cycle frequency discharge may be generated by a sinusoidal generator and this may be crossed with a discharge generated by an impulse generator delivering energy quanta of 2.50$k$ ergs which may be equivalently expressed as a wave length of 120 meters.

The following Table VII illustratively sets forth energies or frequencies that may be advantageously crossed in accordance with the present invention.

Table VII

| The Smaller Quanta | | | The Larger Quanta | | |
|---|---|---|---|---|---|
| Energy in Ergs $\frac{}{k}$ | Frequency in Megacycles | Wave lengths in Meters | Energy in Ergs $\frac{}{k}$ | Frequency in Megacycles | Wave lengths in Meters |
| 0.00006 | 0.00006 | 5,000,000 | *2.11 | 2.11 | 142 |
| 0.00006 | .00006 | 5,000,000 | *0.264 | 0.264 | 1,152 |
| 0.00006 | .00006 | 5,000,000 | *16.7 | 16.7 | 18 |
| 0.00006 | .00006 | 5,000,000 | *0.132 | 0.132 | 2,304 |
| 0.00006 | .00006 | 5,000,000 | *0.528 | 0.528 | 576 |
| .001 | .001 | 300,000 | *1.061 | 1.061 | 71 |
| .01 | .01 | 30,000 | *2.11 | 2.11 | 142 |
| 0.2 | 0.2 | 1,500 | *0.526 | 0.526 | 576 |
| 0.00001 | 0.00001 | 30,000,000 | *16.7 | 16.7 | 18 |
| *2.11 | 2.11 | 142 | *16.7 | 16.7 | 18 |
| *2.11 | 2.11 | 142 | 3,000 | 3,000 | 0.10 |
| *16.7 | 16.7 | 18 | 30,000 | 30,000 | 0.01 |
| *2.11 | 2.11 | 142 | 2.5 | 9.5 | 120 |

*Denote critical energy, frequency and wave lengths.

Referring to Table VII it is to be noted that a wave length of 142 meters, this being a critical peak wave length, is crossed with a wave length of 5,000,000 meters. This is an example of crossing a critical wave length which has the larger energy quantum with a non-critical wave length which has the smaller quanta energy, the discharges produced by said energy components emanating from separately spaced electrodes, all as herein more specifically set forth.

It is to be noted that a critical wave length of 142 meters which corresponds to 2.11 megacycles or 2.11$k$ ergs of energy may be crossed with a non-critical frequency of 0.10 meters, which is equivalent to 3,000$k$ ergs of energy or 3,000 megacycles.

Referring to line 4, from the bottom, of Table VII, it will be seen that a critical wave length of 142 meters is crossed with a critical wave length of 18 meters, the latter corresponding to 16.7 megacycles frequency or 16.7$k$ ergs of energy.

Table VII is merely illustrative of the energy of smaller quantum that may be crossed with the energy of larger quantum and having once set forth particular combinations those skilled in the art will thereby be enabled to cross other energy components, all in accordance with the present invention.

As pointed out, in the preferred form of the invention it is desirable that the critical frequency or energy quantum component comprise at least about 6 to 8 per cent of the total energy supplied, although for the highest yields, the critical frequency or energy quantum component may range from 35–65 per cent of the total energy supplied. It is not intended by the above to limit the present invention to the treatment of gaseous matter employing crossed discharges of the character set forth wherein the critical frequency or energy component comprises at least 6 to 8 per cent of the total energy supplied, as there are many advantages residing in the utilization of crossed discharges of the character set forth when the percentage of critical frequency or energy quantum component is lower than 6 to 8%.

It may be stated that the use of even ½% of critical frequency or of a critical energy quantum crossed with a non-critical frequency or non-critical energy quantum produces a marked increase in yield. In fact, the first 1% of the critical frequency or critical energy quantum produces a greater increase in yield than does subsequent percentage increments of critical frequency or of critical energy quantum component.

Even as little as 1% of high frequency energy when crossed with a lower frequency energy offers a commercial advantage. When effecting the electrochemical transformation of gaseous material by subjecting same to the action of a plurality of crossed electrical discharges emanating from separately spaced electrodes supplied with energy of substantially different frequencies or energy of substantially different quanta, substantial advantages, from an operating standpoint, are presented when using ½, 1, 2, 3, 4, 5, 6, 7 or 8% of the critical frequency component. The above clearly indicates that the present invention is not limited to the use of 6 to 8% of a critical energy component. However, at about 6 to 8% of the critical energy component, the technical advantage, in terms of yield, exceeds the yield that can be obtained when either the critical energy component alone or the non-critical energy component alone, operating under any known conditions. It is, therefore, clear that as the percentage of high frequency or critical energy component increases there is a corresponding increase in yield, the maximum yield occurring when the critical high frequency or energy component varies from about 35 to 65% of the total cyclic energy supplied to the system. Where the terms "low frequency energy" and "high frequency energy" have been used in the above and other discussions herein set forth, said terms are to be construed in view of the definitions herein set forth.

It has been stated that in one of the experiments the velocity of the air passing through the reactor vessel is about 356 c. c. per minute. It is important to supply to the reactor sufficient air per minute so that substantial maximum yield of the transformed product for the frequency used is obtained. It is necessary to determine empirically the proper velocity to be used for any given apparatus operated at any given frequency, since the minimum velocity which will produce substantially maximum yield of the transformed product depends on the reactor design, including the discharge gaps and the magnitude and frequency of the power supplied. It is obvious that in accordance with the law of mass action as applied to the curve of Figure 8 that the actual minimum velocity curve will have a contour which would be similar to and which would follow curve C—D—E of Figure 8. It is to be remembered that the velocity of flow of the material to be transformed through the reactor is critical only in the sense that it affects the yield obtained. If velocities lower or higher than the minimum critical velocity are used, all the advantages of the present invention are obtained, but the yield may be substantially less than it would have been if the preferred velocity or even a higher velocity were employed. In practice it is customary to employ a velocity of from 50 to 150 per cent in excess of the critical minimum velocity. It may be pointed out that if the velocity is increased 50 per cent over the minimum velocity, there is no corresponding 50 per cent increase in yield. On the other hand, if the velocity of passage through the reactor of the material being transformed is substantially decreased below the critical minimum value, then there is a substantial decrease in the yield, in accordance with the law of mass action. Not only does this relationship hold for crossed discharges of the character set forth, but it also holds when the gaseous material is subjected to the action of a high frequency discharge alone, that is, when the high frequency discharge is not crossed with a low frequency discharge, said crossed discharges emanating from separately spaced electrodes.

In accordance with the present invention, when using crossed discharges to treat a gaseous material for the purpose of transforming said material, the minimum critical velocity is necessarily greater when using frequencies corresponding with peak yields than when the frequency is much lower or higher than the critical frequency. This is all in accordance with the law of mass action. It is obvious that when operating along any of the base line frequencies there is a critical minimum velocity and that when operating on the peak frequencies this critical velocity must be greatly increased.

In the illustrative examples herein set forth it has been stated that the air, before passage to and through the gas discharge apparatus, is treated to reduce the moisture component of the air and to remove any constituent that might be absorbed by the silica gel absorbers. On large scale operations while the air can be so treated to remove the components above set forth, it is not necessary. Therefore, this treatment of the air, including the drying step is optional.

It may be stated that using critical electrode frequencies or critical electrode energy quanta there is a flood of ions from the electrodes, said flood of ions being active in producing the peak electrode yields of the electro-chemically transformed product. This flood of ions at the critical frequencies is herein termed electroionic emission; that is, at the critical electrical frequencies there is an emission of ions over and above the emission resulting from the use of non-critical frequencies or energy quanta. This super flood of ions at the critical electrical discharges which may be produced by cyclic energy of a sinusoidal character or by impulse energy may be inhibited, terminated or quenched when there are present in the electrode material certain ingredients which inhibit, prevent or quench the flow of ions at the critical frequencies or energy quanta. These ingredients may be termed "poisons" and not only will inhibit or quench the flow of ions at the critical frequencies but will also inhibit or quench the flow of ions at the base line frequencies. Therefore, in carrying out the present invention, it is of paramount importance that the electrode material be capable of being activated at the critical frequencies and that poisons which inhibit the electroionic emission be absent.

It has been discovered that iron and aluminum have such quenching effect when present in a copper lithium alloy electrode.

In a given experiment, wherein the gas discharge apparatus was provided with a plurality of separately spaced electrodes, the apparatus was provided first with four pure copper electrodes, then with four copper electrodes containing 98% copper, 2% lithium; and then with four copper electrodes containing 97.5% copper, 2% lithium, and 0.5% aluminum. In these experiments one of the crossed discharges was generated by a critical energy component. When the pure copper electrodes were used there were produced 117 grams of nitric oxide, calculated as nitric acid per kilowatt hour. When there were substituted for the pure copper electrodes a plurality of electrodes containing 98% copper and 2% lithium, there was produced 276 grams of nitric oxide calculated as nitric acid per kilowatt hour. In both experiments critical frequencies were used.

When for the copper-lithium electrodes there were substituted four electrodes containing 97.5% copper, 2% lithium and 0.5% aluminum, the yield obtained was approximately 91 to 92 grams of nitric oxide calculated as nitric acid per kilowatt hour, which is considerably less than that obtained when using four copper electrodes alone. The presence of the aluminum has inhibited the electroionic emission of the electrode at the critical frequencies or critical energy quanta.

Iron, likewise, will act to inhibit or quench the electroionic emission of the copper-lithium electrode.

It has been previously stated that when carrying out the present invention using a single pair of electrodes having a discharge therebetween generated by cyclic energy of the character set forth that the power factor was assumed to be 1.00. It is estimated that the power factor is closer to 0.12 when using high frequency alone.

When the crossed discharges are used as herein set forth, it is estimated that the power factor is nearer 0.30.

Assuming the above power factors, the experimental yields produced in accordance with Examples I to VII, inclusive, may be reviewed on a basis of the estimated power factor. These yields are set forth in the following Table VIII.

Table VIII

| Example | Gms. HNO₃ k.w.h. basis P. F.=1.00 | Best estimated actual P. F. | Recalculated Gms. HNO₃ k.w.h. basis estimated power factor |
|---|---|---|---|
| 1 | 276.0 | .30 | 920 |
| 2 | 270.9 | .30 | 903 |
| 3 | 83.0 | .12 | 692 |
| 4 | 140.5 | .30 | 468 |
| 5 | 186.7 | .30 | 622 |
| 6 | 13.0 | .30 | *43 |
| 7 | 78.0 | .30 | *260 |

*These results are still very low due to factors set forth in the description of the experiment.

This application is a continuation in part of the following applications: Serial No. 489,828, filed June 5, 1943; Serial No. 497,678, filed Aug. 6, 1943; Serial No. 501,478, filed Sept. 7, 1943; now abandoned; Serial No. 502,021, filed Sept. 11, 1943, now abandoned; Serial 511,146, filed Nov. 20, 1943, now abandoned; Serial No. 526,933, filed Mar 17, 1944, now abandoned; Serial No. 546,882, filed July 27, 1944.

The following table shows the equivalents of megacycles and ergs:

| Megacycles per second | Erg-seconds |
|---|---|
| 0.13 | $0.085 \times 10^{-20}$ |
| 0.2 | $0.131 \times 10^{-20}$ |
| 0.26 | $0.170 \times 10^{-20}$ |
| 2.04 | $1.337 \times 10^{-20}$ |
| 2.19 | $1.435 \times 10^{-20}$ |
| 3.95 | $2.589 \times 10^{-20}$ |
| 4.54 | $2.976 \times 10^{-20}$ |
| 7.32 | $4.798 \times 10^{-20}$ |
| 9.68 | $6.344 \times 10^{-20}$ |
| 33.00 | $21.63 \times 10^{-20}$ |
| 75.00 | $49.16 \times 10^{-20}$ |

The method of producing nitrogen oxide in which there is employed a critical gas reaction frequency between the limits of about 2.19 mc. (137 meters) or 2.22 mc. (135 meters) and 2.07 mc. (145 meters) or 2.04 mc. (147 meters) and simultaneously the reaction is carried out in the presence of an electrode in which copper predominates or in which nickel predominates is claimed in applicant's co-pending application Serial No. 99,815, filed June 17, 1949. The production of nitrogen oxide using crossed discharges, one of such discharges being generated by cyclic electrical energy quantum equivalent to a sinusoidal frequency between about 10 mc. (30 meters) and about 7.14 mc. (42 meters) or by a sinusoidal frequency between about 4.39 mc. (70 meters) and about 4.00 mc. (75 meters), the production of nitrogen oxide being carried out in the presence of a metal-containing electrode in which nickel predominates or a metal-containing electrode in which copper predominates is claimed in applicant's co-pending application, Serial No. 53,520, filed October 8, 1949. There is also claimed in said co-pending application the production of nitrogen oxide utilizing a critical gas reaction operating frequency between the limits of about 8.88 mc. (34 meters) and about 7.5 mc. (40 meters), the operating frequency being uncrossed, the production of the nitrogen oxide being carried out in the presence of a metal-containing electrode in which copper predominates or in which nickel predominates.

There is claimed in co-pending application Serial No. 546,882, filed July 27, 1944, the process of producing nitrogen oxide from a nitrogen-and-oxide-containing gaseous medium by subjecting the latter to the action of a composite cyclic electrical discharge produced by the intersection of a plurality of separate cyclic electrical discharges differing in energy quantum, said separate electrical discharges being generated by cyclic electrical energy differing in energy quantum from each other by at least an amount lying between the limits of $6.5 \times 10^{-22}$ ergs (100,000 cycles) and $1.31 \times 10^{-21}$ ergs (200,000 cycles), each of said discharges having an energy quantum of less than $1.97 \times 10^{-16}$ ergs (30,000 mc.).

There is claimed in co-pending application Serial No. 99,816, filed June 17, 1949, the production of nitrogen oxide from a nitrogen-and-oxygen-containing gaseous medium by subjecting the gaseous material to the action of a composite cyclic luminous electrical discharge produced by the intersection of a plurality of separate cyclic electrical discharges differing in energy quantum, one of said discharges being generated by a cyclic electrical energy quantum equivalent to a sinusoidal frequency between about 1.50 mc. (200 meters) and about 1.33 mc. (225 meters), the production of the nitrogen oxide being carried out in the presence of an electrode comprising an alloy of a metal having an atomic number selected from the group of numbers consisting of 28 and 29, that is, copper and nickel, the electrode, in one form of the invention, being an alloy which may contain lithium, in addition to copper or nickel.

The production of nitrogen oxide in the presence of tantalum electrodes at certain predetermined frequencies herein set forth is claimed in the following co-pending applications: Serial No. 489,828 (now abandoned), filed June 5, 1943; Serial No. 497,678 (now abandoned), filed August 6, 1943; Serial No. 790,568, filed December 9, 1947.

The production of nitrogen oxide in the presence of certain of the herein set forth electrode materials is also claimed in co-pending application Serial No. 779,561, filed October 13, 1947. Certain of the apparatus herein set forth is claimed in U. S. Patents Nos. 2,468,173, 2,468,174 and 2,468,175, all granted April 26, 1949.

I claim:

1. The method of producing nitrogen oxide comprising introducing a nitrogen-and-oxygen-containing gaseous medium into a gas discharge apparatus provided with at least three separately spaced electrodes whose extended axes pass through a common point, said electrodes being located in at least two quadrants, two of said quadrants being oppositely positioned, the so-disposed electrodes defining at least two electrode gaps, the terminals for each gap being in different quadrants, and subjecting said gaseous medium to the action of a composite cyclic electrical discharge produced by a plurality of cyclic electrical discharges of different energy quanta which intersect and extend across their respective electrode gaps, one of said discharges having an energy quantum equivalent to about that present in cyclic sinusoidal waves measured in meters equal to one of the following: 4.5, 9, 18, 36, 72, 144, 288, 576, 1,152, 2,308, 4,616, 9,232, and 18,464, said wave lengths being related one to the other by the exponential expression $2^n l$, where $l$ is one of said series of wave lengths characteristic of the gaseous medium being reacted in producing a peak yield of the transformed product, and $n$ is any one of the integers from $-10$ to $+10$ including zero which results in a wave length lying within the set forth limits of said series.

2. The method of producing nitrogen oxide comprising introducing a nitrogen-and-oxygen-containing gaseous medium into a gas discharge apparatus provided with a plurality of pairs of electrodes, the extended axis between one pair of electrodes crossing the extended axis between another pair of electrodes and subjecting said gaseous medium to the action of a composite electrical discharge produced from a plurality of separate cyclic electrical discharges of different energy quanta, one of said discharges being generated by cyclic energy passing between one pair of electrodes and another of the discharges being generated by cyclic energy passing between the other pair of electrodes, said discharges intersecting and extending across the respective electrode gaps defined by said pairs of electrodes, one of said discharges having an energy quantum equivalent to about that present in cyclic sinusoidal waves measured in meters equal to one of the following: 4.5, 9, 18, 36, 72, 144, 288, 576, 1,152, 2,308, 4,616, 9,232, 18,464, said wave lengths being related one to the other by the exponential expression $2^n l$, where $l$ is one of a series of wave lengths characteristic of the gaseous medium being reacted in producing a peak yield of the transformed product, and $n$ is any one of the integers from $-10$ to $+10$ including zero which results in a wave length lying within the set forth limits of said series.

3. The method of producing nitrogen oxide comprising introducing a nitrogen-and-oxygen-containing gaseous medium into a gas discharge apparatus provided with a plurality of pairs of electrodes, the extended axis between one pair of electrodes crossing the extended axis between another pair of electrodes and subjecting said gaseous medium to the action of a composite electrical discharge produced from a plurality of separate cyclic electrical discharges, one of said discharges being generated by cyclic energy passing between one pair of electrodes and another of the discharges being generated by cyclic energy passing between the other pair of electrodes, said discharges intersecting and extending across the respective electrode gaps defined by said pairs of electrodes, one of said discharges having an energy quantum equivalent to about that present in cyclic sinusoidal waves measured in meters equal to one of the following: 4.5, 9, 18, 36, 72, 144, 288, 576, 1,152, 2,308, 4,616, 9,232, 18,464, said wave lengths being related one to the other by the exponential expression $2^n l$, where $l$ is one of said wave lengths characteristic of the gaseous medium being reacted in producing a peak yield of the transformed product, and $n$ is any one of the integers from $-10$ to $+10$, including zero which results in a wave length lying between the set forth limits of said series, and the other discharge is generated by a cyclic energy quantum equivalent to that present in a 10 cycle to 1,000 cycle frequency band.

4. The method of producing nitrogen oxide in a gas discharge apparatus, having present separately spaced electrodes, from a nitrogen-and-oxygen-containing gaseous medium which forms nitrogen oxide upon treatment with an electrical discharge comprising subjecting said gaseous medium to treatment with an electrical discharge produced by the said electrodes and generated by one of a series of energy quanta, each of which has an energy quantum equivalent to about that present in cyclic sinusoidal waves of a wave length measured in meters equal to one of the following: 18, 36, 72, 144, 288, and 576.

5. The method of producing nitrogen oxide in a gas discharge apparatus, having present separately spaced electrodes, from a nitrogen-and-oxygen-containing gaseous medium which forms nitrogen oxide upon treatment with an electrical discharge comprising subjecting said gaseous medium to treatment with an electrical discharge produced by the said electrodes and generated by one of a series of energy quanta, each of which has an energy quantum equivalent to about that present in cyclic sinusoidal waves of a wave length measured in meters equal to one of the following: 18, 36, 72, 144, 288, and 576, said waves being related one to the other by the exponential expression "$2^n l$" where "$l$" is one of said waves characteristic of the gaseous medium being reacted and producing a peak yield of a transformed product, and "$n$" is one of the integers from $-10$ to $+10$, including zero which results in a wave length lying within the set forth limits of said series.

6. The method of producing nitrogen oxide in a gas discharge apparatus having disposed therein a plurality of electrodes to supply the apparatus with a plurality of cyclic electrical discharges having different energy quanta from a nitrogen-and-oxygen-containing medium which forms nitrogen oxide upon treatment with an electrical discharge comprising subjecting said gaseous medium to the action of a composite cyclic electrical discharge produced by the intersection of at least two cyclic electrical discharges of different energy quantum, one of said discharges having an energy quantum equivalent to about that present in cyclic sinusoidal waves of a wave length measured in meters equal to one of the following: 18, 36, 72, 144, 288, 576.

7. The method of producing nitrogen oxide in a gas discharge apparatus having disposed therein a plurality of electrodes to supply the apparatus with a plurality of cyclic electrical discharges having different energy quanta from a nitrogen-and-oxygen-containing medium which forms nitrogen oxide upon treatment with an electrical discharge comprising subjecting said gaseous medium to the action of a composite cyclic electrical discharge produced by the intersection of at least two cyclic electrical discharges differing in energy quantum by at least 0.2 of the energy quantum present in a sinusoidal wave of 1 mc. frequency, one of said discharges having an energy quantum equivalent to about that present in cyclic sinusoidal waves of a wave length measured in meters equal to one of the following: 18, 36, 72, 144, 288, 576.

8. The method of producing in a gas discharge apparatus, having present separately spaced electrodes, nitrogen oxide from a nitrogen-and-oxygen-containing gaseous medium which forms nitrogen oxide upon treatment with an electrical discharge comprising subjecting said gaseous medium to treatment with an electrical discharge produced by the said electrodes and generated by one of a series of energy quanta while utilizing minimum sustaining energy, each of which has an energy quantum equivalent to about that present in cyclic sinusoidal wave lengths of a wave length in one of the following sinusoidal waves of a wave length measured in meters equal to: 18, 36, 72, 144, 288, and 576, and inhibiting the decomposition of the nitrogen oxide formed in the gas discharge apparatus by keeping the temperature of the discharge between about 20° C. and about 450° C.

9. The method of producing a peak yield of nitrogen oxide in a gas discharge apparatus having disposed therein spaced electrodes, from a nitrogen-and-oxygen-containing gaseous medium which forms nitrogen oxide upon treatment with an electrical discharge, comprising subjecting said gaseous medium to treatment with a luminous electrical discharge produced between said electrodes and generated by cyclic energy having an energy quantum equivalent to that present in cyclic sinusoidal waves of a wave length lying between the wave band limits of 137 and 147 meters.

10. The method of producing a peak yield of nitrogen oxide in a gas discharge apparatus having disposed therein spaced electrodes, from a nitrogen-and-oxygen-containing gaseous medium which forms nitrogen oxide upon treatment with an electrical discharge, comprising subjecting said gaseous medium to treatment with a luminous electrical discharge produced between said electrodes and generated by cyclic energy having an energy quantum equivalent to about that present in a cyclic sinusoidal wave of 72 meters length lying between the wave band limits of 66 and 76 meters.

11. The method of producing nitrogen oxide in a gas discharge apparatus from a nitrogen-and-oxygen-containing gaseous medium which forms nitrogen oxide upon treatment with an electrical discharge, said gas discharge apparatus having an assemblage of at least three separately spaced electrodes therein, at least two of said electrodes being high potential electrodes, said assemblage of electrodes being positioned to have a cyclic electrical discharge pass between a pair thereof, one of said pair being a low potential electrode comprising subjecting said gaseous medium simultaneously to a plurality of separate cyclic electrical discharges each of which emanate from a separate high potential electrode, said discharges intersecting to form a composite discharge and differing in energy quantum by at least .2 of the energy quantum present in a sinusoidal wave of 1 mc. frequency, one of said discharges being generated by an energy quantum equivalent to about that present in cyclic sinusoidal waves of a wave length lying between 137 and 147 meters.

12. The method of producing nitrogen oxide in a gas discharge apparatus from a nitrogen-and-oxygen-containing gaseous medium which forms nitrogen oxide upon treatment with an electrical discharge, said gas discharge apparatus having an assemblage of at least three separately spaced electrodes therein, at least two of said electrodes being high potential electrodes, said assemblage of electrodes being positioned to have a cyclic electrical discharge pass between a pair thereof, one of said pair being a low potential electrode comprising subjecting said gaseous medium simultaneously to a plurality of separate cyclic electrical discharges each of which emanate from a high potential electrode, said discharges intersecting to form a composite discharge and differing in energy quantum by at least .2 of the energy quantum present in a sinusoidal wave of 1 mc. frequency, one of said discharges being generated by an energy quantum equivalent to about that present in cyclic sinusoidal waves of a wave length lying between the wave band limits of 36 and 41 meters.

13. The method of producing nitrogen oxide in a gas discharge apparatus from a nitrogen-and-oxygen-containing gaseous medium which forms nitrogen oxide upon treatment with an electrical discharge, said gas discharge apparatus having an assemblage of at least three separately spaced electrodes therein, at least two of said electrodes being high potential electrodes, said assemblage of electrodes being positioned to have a cyclic electrical discharge pass between a pair thereof, one of said pair being a low potential electrode comprising subjecting said gaseous medium simultaneously to a plurality of separate cyclic electrical discharges each of which emanate from a separate high potential electrode, said discharges intersecting to form a composite discharge and differing in energy quantum by at least 0.2 of the energy quantum present in a sinusoidal wave of 1 mc. frequency, one of said discharges being generated by an energy quantum equivalent to about that present in cyclic sinusoidal waves of a wave length lying between the wave band limits of 66 and 76 meters.

14. The method of producing a peak yield of nitrogen oxide in a gas discharge apparatus having disposed therein spaced electrodes, from a nitrogen-and-oxygen-containing gaseous medium which forms nitrogen oxide upon treatment with an electrical discharge, comprising subjecting said gaseous medium to treatment with a luminous electrical discharge produced between said electrodes and generated by cyclic energy having an energy quantum equivalent to that present in a cyclic sinusoidal wave of a wave length equal to about 36 meters.

15. The method of producing nitrogen oxide in a gas discharge apparatus having disposed therein a plurality of electrodes to supply the apparatus with a plurality of cyclic electrical discharges having different energy quanta from a nitrogen-and-oxygen-containing medium which forms nitrogen oxide upon treatment with an electrical discharge comprising subjecting said gaseous medium to the action of a composite cyclic electrical discharge produced by the intersection of at least two cyclic electrical discharges of different energy quantum, one of said discharges having an energy quantum equivalent to about that present in cyclic sinusoidal waves of a wave length measured in meters equal to one of the following: 18, 36, 72, 144, 288, 576, 1152, 2308, 4616, 9232, 18464, the discharge furnishing said latter energy quantum being supplied to the gas discharge apparatus in an amount varying between 6% and 65% of the total energy supplied.

16. The method of producing nitrogen oxide in a gas discharge apparatus having disposed therein a plurality of electrodes to supply the apparatus with a plurality of cyclic electrical discharges having different energy quanta from a nitrogen-and-oxygen-containing medium which forms nitrogen oxide upon treatment with an electrical discharge comprising subjecting said gaseous medium to the action of a composite cyclic electrical discharge produced by the intersection of at least two cyclic electrical discharges of different energy quantum while utilizing minimum sustaining energy, one of said discharges having an energy quantum equivalent to about that present in cyclic sinusoidal waves of a wave length measured in meters equal to one of the following: 18, 36, 72, 144, 288, 576.

17. The method of producing nitrogen oxide in a gas discharge apparatus having disposed therein a plurality of electrodes to supply the apparatus with a plurality of cyclic electrical discharges having different energy quanta from a nitrogen-and-oxygen-containing medium which forms nitrogen oxide upon treatment with an electrical discharge comprising subjecting said gaseous medium to the action of a composite cyclic electrical discharge produced by the intersection of at least two cyclic electrical discharges of different energy quantum while utilizing minimum sustaining energy, one of said discharges having an energy quantum equivalent to about that present in cyclic sinusoidal waves of a wave length measured in meters equal to one of the following: 18, 36, 72, 144, 288, 576, 1152, 2308, 4616, 9232, 18464, the discharge furnishing said energy quantum being supplied to the gas discharge apparatus in an amount varying between 6% and 65% of the total energy supplied.

18. The method of producing nitrogen oxide in a gas discharge apparatus from a nitrogen-and-oxygen-containing gaseous medium which forms nitrogen oxide upon treatment with an electrical discharge, said gas discharge apparatus having an assemblage of at least three separately spaced electrodes therein, at least two of said electrodes being high potential electrodes, said assemblage of electrodes being positioned to have a cyclic electrical discharge pass between a pair thereof, one of said pair being a low potential electrode comprising subjecting said gaseous medium simultaneously to a plurality of separate cyclic electrical discharges each of which emanate from a high potential electrode, said discharges intersecting to form a composite discharge and differing in energy quantum by at least .2 of the energy quantum present in a sinusoidal wave of 1 mc. frequency, one of the discharges generated having an energy quantum equivalent to about that present in cyclic sinusoidal waves measured in meters equivalent to one of the following: 4.5, 9, 18, 36, 72, 144, 288, 576, 1152, 2308, 4616, 9232 and 18464.

19. The method of producing nitrogen oxide in a gas discharge apparatus from a nitrogen-and-oxygen-containing gaseous medium which forms nitrogen oxide upon treatment with an electrical discharge, said gas discharge apparatus having an assemblage of at least three separately spaced electrodes therein, at least two of said electrodes being high potential electrodes, said assemblage of electrodes being positioned to have a cyclic electrical discharge pass between a pair thereof, one of said pair being a low potential electrode comprising subjecting said gaseous medium simultaneously to a plurality of separate cyclic electrical discharges each of which emanate from a high potential electrode, said discharges intersecting to form a composite discharge and differing in energy quantum by at least .2 of the energy quantum present in a sinusoidal wave of 1 mc. frequency, one of the discharges generated having an energy quantum equivalent to about that present in cyclic sinusoidal waves measured in meters equivalent to one of the following: 4.5, 9, 18, 36, 72, 144, 288, 576, 1152, 2308, 4616, 9232, and 18464, the discharge furnishing said energy quantum being supplied to the gas discharge apparatus in an amount varying between 6% and 65% of the total energy supplied.

20. The method of producing nitrogen oxide in a gas discharge apparatus having disposed therein a plurality of electrodes to supply the apparatus with a plurality of cyclic electrical discharges having different energy quanta from a nitrogen-and-oxygen-containing medium which forms nitrogen oxide upon treatment with an electrical discharge comprising subjecting said gaseous medium to the action of a composite cyclic electrical discharge produced by the intersection of at least two cyclic electrical discharges of different energy quantum, one of said discharges having an energy quantum equivalent to about that present in cyclic sinusoidal waves of a wave length measured in meters equal to one of the following: 18 meters, 36 to 41 meters, in the range of 66 to 76 meters, in the range of 137 to 147 meters, in the range of 280 to 296 meters, and in the range of 565 to 580 meters.

21. The method of producing nitrogen oxide in a gas discharge apparatus having disposed therein a plurality of electrodes to supply the apparatus with a plurality of cyclic electrical discharges having different energy quanta from a nitrogen-and-oxygen-containing medium which forms nitrogen oxide upon treatment with an electrical discharge comprising subjecting said gaseous medium to the action of a composite cyclic electrical discharge produced by the intersection of at least two cyclic electrical discharges of different energy quantum while utilizing minimum sustaining energy and inhibiting the decomposition of the nitrogen oxide formed in the gas discharge apparatus by keeping the temperature of the discharge gas between about 20° C. and about 450° C., one of said discharges having an energy quantum equivalent to about that present in cyclic sinusoidal waves of a wave length measured in meters equal to one of the following: 18, 36, 72, 144, 288, 576, 1152, 2308, 4616, 9232, 18464, the discharge furnishing said energy quantum being supplied to the gas discharge apparatus in an amount varying between 6% and 65% of the total energy supplied.

22. The method of producing nitrogen oxide comprising introducing a gaseous medium consisting principally of oxygen gas and nitrogen gas into a gas discharge reactor, provided with a plurality of electrodes disposed therein to supply the reactor with a plurality of cyclic electrical discharges having different energy quanta and subjecting said gaseous medium to the action of a composite luminous electrical discharge produced by the intersection of at least two separate cyclic electrical discharges of different energy quantum, one of said discharges being generated by a cyclic electric energy having an energy quantum equivalent to a sinusoidal frequency between about 2.19 mc. (137 meters) and about 2.04 mc. (147 meters), said frequency band being a critical frequency band for activating the nitrogen-and-oxygen-containing medium which is being reacted.

23. The method of producing nitrogen oxide comprising introducing a gaseous medium consisting principally of oxygen gas and nitrogen gas into a gas discharge reactor, provided with a plurality of electrodes disposed therein to supply the reactor with a plurality of cyclic electrical discharges having different energy quanta and subjecting said gaseous medium to the action of a composite luminous electrical discharge produced by the intersection of at least two separate cyclic electrical discharges of different energy quantum, one of said discharges being generated by a cyclic energy quantum equivalent to a sinusoidal frequency between about 2.19 mc. (137 meters) and about 2.04 mc. (147 meters), said frequency band being a critical frequency band for activating the nitrogen- and oxygen-containing medium which is being reacted, the total amount of energy contributed by the critical frequency component being at least 6% of the total energy generated by said composite luminous electrical discharge.

24. The method of producing nitrogen oxide comprising introducing a gaseous medium consisting principally of oxygen gas and nitrogen gas into a gas discharge reactor, provided with a plurality of electrodes disposed therein to supply the reactor with a plurality of cyclic electrical discharges having different energy quanta and subjecting said gaseous medium to the action of a composite luminous electrical discharge produced by the intersection of at least two separate cyclic electrical discharges of different energy quantum, one of said discharges being generated by a cyclic energy quantum equivalent to a sinusoidal frequency between about 2.19 mc. (137 meters) and about 2.04 mc. (147 meters), said frequency band being a critical frequency band for activating the nitrogen- and oxygen-containing medium which is being reacted, the total amount of energy contributed by the critical frequency component varying between about 6% and about 65% of the total energy generating said composite luminous electrical discharge.

25. The method of producing nitrogen-oxide comprising introducing a nitrogen- and oxygen-containing gaseous medium into a gas discharge reactor provided with a plurality of electrodes disposed therein to supply the reactor with a plurality of cyclic electrical discharges each of which has a different energy quantum and subjecting said gaseous medium to the action of a composite luminous electrical discharge produced by the intersection of at least two separate cyclic electrical discharges of different energy quantum while maintaining the temperature of the reaction mass in a gaseous state and below 186° C., one of said discharges being generated by a cyclic energy quantum equivalent to a sinusoidal frequency between about 2.19 mc. (137 meters) and about 2.04 mc. (147 meters), said frequency band being a critical wave band for activating the oxygen and the nitrogen-containing medium which is being reacted.

26. The method of producing nitrogen oxide comprising introducing into a reactor provided with separately spaced electrodes adapted to generate cyclic electrical discharges which cross each other, a nitrogen- and oxygen-containing gaseous medium which produces nitrogen oxide upon treatment with crossed electrical discharges, and simultaneously subjecting said gaseous medium to a plurality of electrical discharges of different energy quantum and which emanate from said separately spaced electrodes supplied by separate sources of cyclic energy, said cyclic electrical discharges crossing each other to define a visible composite volume larger than the volume of either discharge alone when the energy to generate either of said discharges is equal to the total energy supplied to the crossed discharges, one of said discharges being generated by a cyclic energy quantum equivalent to a sinusoidal frequency between about 2.50 mc. (120 meters) and about 1.875 mc. (160 meters).

27. The method of producing nitrogen oxide comprising introducing a gaseous medium consisting principally of nitrogen gas and oxygen gas into a gas discharge apparatus having an assemblage of at least three separately spaced electrodes provided with electrode terminals, two of said electrode terminals being high potential electrode terminals, said assemblage of electrodes being positioned to have cyclic electrical discharge pass between a pair thereof, one of said electrodes being a low potential electrode, and subjecting said gaseous medium while under a pressure of between about 150 millimeters of mercury and about 725 millimeters of mercury to the action of a composite cyclic electrical discharge produced by the intersection of a plurality of separate cyclic electrical discharges differing in energy quantum, each of said discharges emanating from a separate high potential terminals, one of said discharges being generated by a cyclic energy quantum equivalent to a sinusoidal frequency between about 250 mc. (120 meters) and about 1.875 mc. (160 meters).

28. The method of producing nitrogen oxide comprising introducing into a reactor provided with separately spaced electrodes adapted to generate cyclic electrical discharges which cross each other, a nitrogen- and oxygen-containing gaseous medium which produces nitrogen oxide upon treatment with crossed electrical discharges, and simultaneously subjecting said gaseous medium to the action of a composite cyclic electrical discharge produced by the intersection of a plurality of separate cyclic electrical discharges differing in energy quantum, one of said discharges being generated by a cyclic energy quantum equivalent to a sinusoidal frequency between about 2.50 mc. (120 meters) and about 1.875 mc. (160 meters), and the other discharge being generated by a cyclic energy quantum equivalent to a sinusoidal frequency between about 10 cycles per second (30,000,000 meters) and about 10,000 cycles per second (30,000 meters).

29. The method of producing nitrogen oxide comprising introducing into a reactor provided with separately spaced electrodes adapted to generate cyclic electrical discharges which cross each other, a nitrogen- and oxygen-containing gaseous medium which produces nitrogen oxide upon treatment with crossed electrical discharges, and simultaneously subjecting said gaseous medium to a plurality of separate electrical discharges emanating from said separately spaced electrodes, said discharges being generated by separate sources of cyclic electrical energy, said cyclic electrical discharges crossing each other to define a visible composite discharge having a volume larger than the volume of either discharge alone when the energy to generate either of said discharges is equal to the total energy supplied to the crossed discharges, one of said discharges being generated by a cyclic energy quantum equivalent to a sinusoidal frequency between about 2.50 mc. (120 meters) and about 1.875 mc. (160 meters), and the other discharge being generated by a cyclic energy quantum equivalent to a sinusoidal frequency between about 10 cycles per second (30,000,000 meters) and about 10,000 cycles per second (30,000 meters).

30. The method of producing nitrogen oxide comprising introducing a gaseous medium consisting principally of nitrogen gas and oxygen gas into a gas discharge apparatus provided with a plurality of at least three separately spaced electrodes having metallic electrode terminals disposed therein to supply the appparatus with a plurality of cyclic electrical discharges differing in energy quantum, two of said terminals being high potential terminals, and subjecting said gaseous medium while under a pressure between about 320 millimeters of mercury and about 360 millimeters of mercury to the action of a composite luminous cyclic electrical discharge produced by the intersection of a plurality of cyclic electrical discharges differing in energy quantum, each of said discharges emanating from a separate electrode and electrode terminal, one of said discharges being generated by a cyclic energy quantum equivalent to a sinusoidal frequency between about 2.50 mc. (120 meters) and about 1.875 mc. (160 meters), and the other discharge being generated by a cyclic energy quantum equivalent to a sinusoidal frequency between about 10 cycles per second (30,000,000 meters) and about 10,000 cycles per second (30,000 meters).

31. The method of producing nitrogen oxide comprising introducing a gaseous medium consisting principally of nitrogen gas and oxygen gas into a gas discharge apparatus having an assemblage of at least three separately spaced electrodes provided with metallic electrode terminals, two of said electrode terminals being high potential electrode terminals, said assemblage of electrodes being positioned to have a cyclic electrical discharge pass between a pair thereof, one of said pair being a low potential electrode, and subjecting said gaseous medium while under a pressure between about 150 millimeters of mercury and about 725 millimeters of mercury to the action of a composite cyclic electrical discharge produced by the intersection of a plurality of separate cyclic electrical discharges differing in energy quantum, each of said discharges emanating from a separate high potential electrode terminal, one of said discharges being generated by a cyclic energy quantum equivalent to a sinusoidal frequency between about 2.50 mc. (120 meters) and about 1.875 mc. (160 meters), and the other discharge being generated by a cyclic energy quantum equivalent to a sinusoidal frequency between about 10 cycles per second (30,000,000 meters) and about 10,000 cycles per second (30,000 meters).

32. The method of claim 31 in which the discharge is a luminous discharge.

33. The method of producing nitrogen oxide comprising introducing a gaseous medium consisting principally of oxygen gas and nitrogen gas into a gas discharge reactor, provided with a plurality of electrodes disposed therein to supply the reactor with a plurality of cyclic electrical discharges having different energy quanta and subjecting said gaseous medium to the action of a composite luminous electrical discharge produced by the intersection of at least two separate cyclic electrical discharges of different energy quantum, one of said discharges being generated by a cyclic electrical energy having an energy quantum equivalent to a sinusoidal frequency between about 2.19 mc. (137 meters) and about 2.04 mc. (147 meters), said frequency band being a critical frequency band for activating the nitrogen-and-oxygen-containing medium which is being reacted, and the other discharge being generated by a cyclic energy quantum equivalent to a sinusoidal frequency between about 1 mc. (300 meters) and 12 mc. (25 meters).

WILLIAM J. COTTON.

REFERENCES CITED

The following references are of record in the file of this patent:

UNITED STATES PATENTS

| Number | Name | Date |
|---|---|---|
| 578,685 | Whitney | Mar. 9, 1897 |
| 2,089,966 | Kassner | Aug. 17, 1937 |
| 2,106,780 | Whittier | Feb. 1, 1938 |
| 2,134,206 | Roberts | Oct. 25, 1938 |
| 2,334,377 | Bennett | Nov. 16, 1943 |

FOREIGN PATENTS

| Number | Country | Date |
|---|---|---|
| 12,541 | Great Britain | 1904 |
| 315,367 | Great Britain | 1930 |
| 354,736 | Great Britain | 1931 |
| 691,099 | France | 1930 |
| 184,871 | Switzerland | 1936 |

OTHER REFERENCES

"The Chemical Action of the Ultraviolet Rays," by Carleton Ellis and Alfred A. Wells (1941), pages 246–248, 274, 290, 291, 326, 327.

Compte Rendus de l'academie des Sciences de l'U R. S. S. (1938), vol. 18, No. 6, pages 329–332; vol. 20, No. 4, pages 297–301.

Helvetica Chimica Acta, vol. 19, pages 289, 291–293, 301, 302, 305, 306, 307.